(12) United States Patent
Kwon

(10) Patent No.: US 10,470,138 B2
(45) Date of Patent: Nov. 5, 2019

(54) APPARATUS AND METHODS FOR VIRTUAL CHANNEL SENSING

(71) Applicant: NEWRACOM, Inc., Lake Forest, CA (US)

(72) Inventor: Young Hoon Kwon, Laguna Niguel, CA (US)

(73) Assignee: NEWRACOM, INC., Lake Forest, CA (US)

( * ) Notice: Subject to any disclaimer, the term of this patent is extended or adjusted under 35 U.S.C. 154(b) by 123 days.

(21) Appl. No.: 15/292,054

(22) Filed: Oct. 12, 2016

(65) Prior Publication Data

US 2017/0105217 A1    Apr. 13, 2017

Related U.S. Application Data

(60) Provisional application No. 62/293,260, filed on Feb. 9, 2016, provisional application No. 62/242,197, filed on Oct. 15, 2015, provisional application No. 62/240,458, filed on Oct. 12, 2015.

(51) Int. Cl.
*H04W 52/24*    (2009.01)
*H04W 28/02*    (2009.01)
(Continued)

(52) U.S. Cl.
CPC ..... *H04W 52/244* (2013.01); *H04W 28/0236* (2013.01); *H04W 52/245* (2013.01);
(Continued)

(58) Field of Classification Search
CPC ........... H04W 72/0453; H04W 52/245; H04W 52/244; H04W 28/0236; H04B 17/318
See application file for complete search history.

(56) References Cited

U.S. PATENT DOCUMENTS

2009/0270109 A1* 10/2009 Wang Helmersson ...... H04W 52/367
455/453
2015/0071051 A1*  3/2015 Zhu ..................... H04W 72/121
370/216

(Continued)

OTHER PUBLICATIONS

IEEE Std 802.11-2012: "Part 11: Wireless LAN Medium Access Control (MAC) and Physical Layer (PHY) Specifications," IEEE Standard for Information technology—Telecommunications and information exchange between systems, Local and metropolitan area networks—Specific requirements, Mar. 29 2012, 2793 pages.

(Continued)

*Primary Examiner* — Omer S Mian
(74) *Attorney, Agent, or Firm* — NDWE, LLP

(57) ABSTRACT

A first station is configured to perform a method and system to transmit frames to a second station where the first station is associated with a first basic service set (BSS) and the method manages interference of the transmission amongst overlapping basic service sets (OBSSs). The first station detects a received frame on a wireless medium. The first station determines whether the received frame is from a second station, which is associated with a second BSS. The first station determines a received signal strength of the received frame. The first station determines that the received signal strength is below a first OBSS preamble detection level, where the first OBSS preamble detection level is associated with a first transmission power. The first station then sets the first transmission power as a maximum transmission power used by the first station for all frame transmissions during a time period.

12 Claims, 17 Drawing Sheets

(51) Int. Cl.

| | |
|---|---|
| *H04W 72/08* | (2009.01) |
| *H04W 74/08* | (2009.01) |
| *H04B 17/318* | (2015.01) |
| *H04W 52/36* | (2009.01) |
| *H04W 52/38* | (2009.01) |
| *H04W 84/12* | (2009.01) |

(52) U.S. Cl.
CPC ....... *H04W 52/246* (2013.01); *H04W 52/367* (2013.01); *H04W 52/383* (2013.01); *H04W 72/082* (2013.01); *H04W 74/0808* (2013.01); *H04W 84/12* (2013.01)

(56) References Cited

U.S. PATENT DOCUMENTS

2017/0078891 A1* 3/2017 Cariou .................. H04W 16/14
2017/0079068 A1* 3/2017 Ahmed ............. H04W 74/0816

OTHER PUBLICATIONS

IEEE Std 802.11ac-2013: "Part 11: Wireless LAN Medium Access Control (MAC) and Physical Layer (PHY) Specifications, Amendment 4: Enhancements for Very High Throughput for Operation in Bands below 6 GHz," IEEE Standard for Information technology—Telecommunications and information exchange between systems, Local and metropolitan area networks—Specific requirements, Dec. 18, 2013, 425 pages.

IEEE P802.11ah/D5.0: "Part 11: Wireless LAN Medium Access Control (MAC) and Physical Layer (PHY) Specifications, Amendment 2: Sub 1 GHz License Exempt Operation," IEEE Draft Standard for Information technology—Telecommunications and information exchange between systems, Local and metropolitan area networks—Specific requirements, Mar. 2015, 632 pages.

* cited by examiner

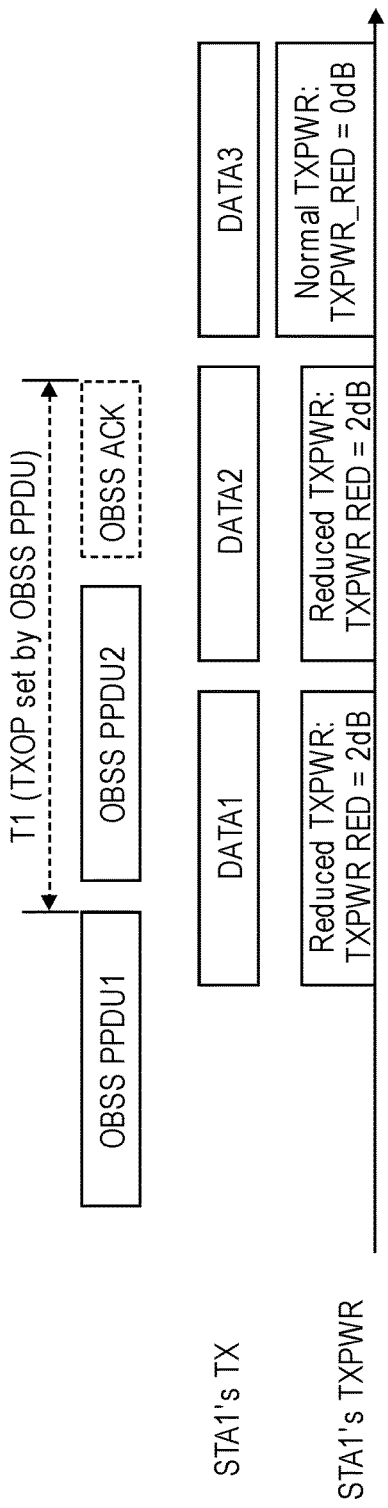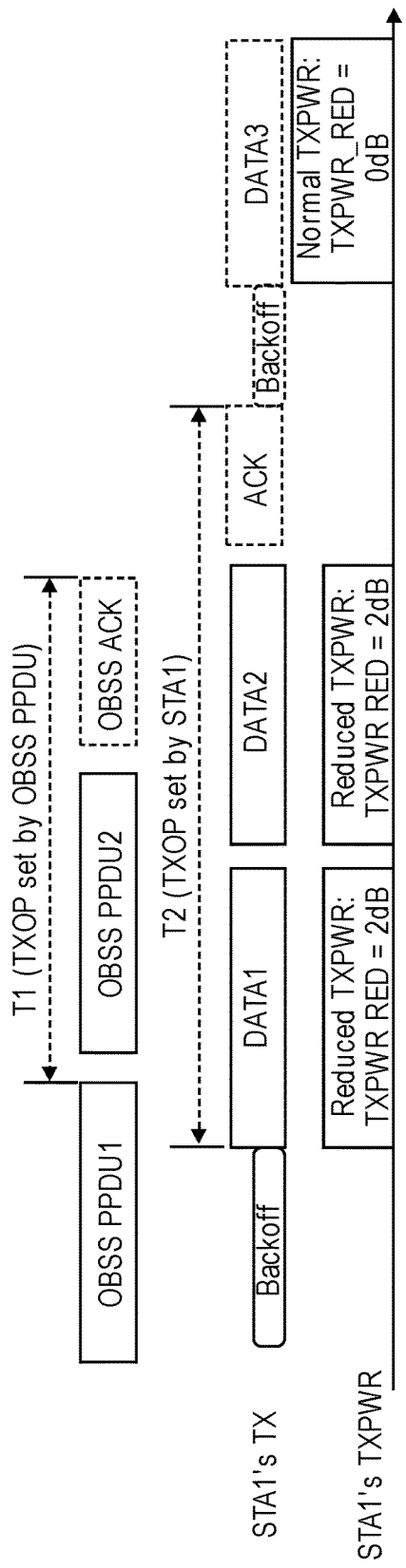
FIG. 4A
FIG. 4B

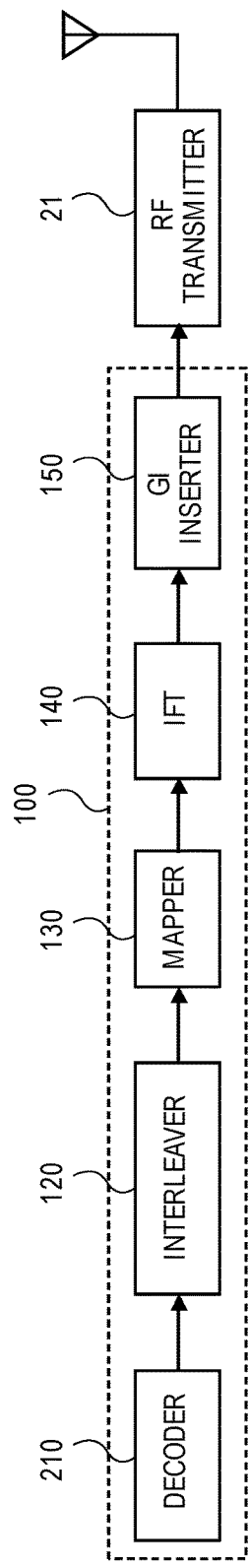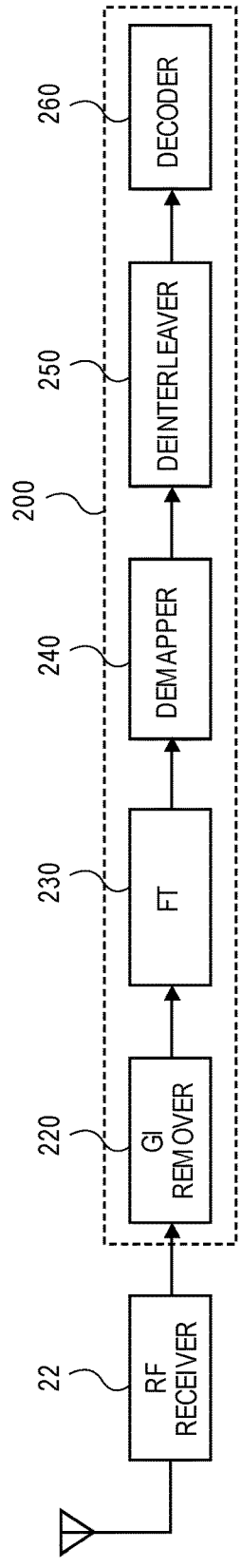

<HE PPDU Format>

APPARATUS AND METHODS FOR VIRTUAL CHANNEL SENSING

CROSS-REFERENCE TO RELATED APPLICATIONS

This application claims the benefit of U.S. Provisional Application 62/240,458, filed Oct. 12, 2015, U.S. Provisional Application 62/242,197 filed Oct. 15, 2015 and U.S. Provisional Application No. 62/293,260, filed Feb. 9, 2016, which are hereby incorporated by reference.

FIELD OF INVENTION

The embodiments are related to the field of Wireless Local Area Network (WLAN) operation. More specifically, the embodiments relate to a method and apparatus for a station to adjust its power transmission level to enable greater spatial reuse.

BACKGROUND

Institute of Electrical and Electronics Engineers (IEEE) 802.11 is a set of physical and Media Access Control (MAC) specifications for implementing wireless local area network (WLAN) communications. These specifications provide the basis for wireless network products using the Wi-Fi brand managed and defined by the Wi-Fi Alliance. The specifications define the use of the 2.400-2.500 GHz as well as the 4.915-5.825 GHz bands. These spectrum bands are commonly referred to as the 2.4 GHz and 5 GHz bands. Each spectrum is subdivided into channels with a center frequency and bandwidth. The 2.4 GHz band is divided into 14 channels spaced 5 MHz apart, though some countries regulate the availability of these channels. The 5 GHz band is more heavily regulated than the 2.4 GHz band and the spacing of channels varies across the spectrum with a minimum of a 5 MHz spacing dependent on the regulations of the respective country or territory.

WLAN devices are currently being deployed in diverse environments. These environments are characterized by the existence of many Access Points (APs) and non-AP stations (STAs) in geographically limited areas. Increased interference from neighboring devices gives rise to performance degradation. Additionally, WLAN devices are increasingly required to support a variety of applications such as video, cloud access, and offloading. Video traffic, in particular, is expected to be the dominant type of traffic in WLAN deployments. With the real-time requirements of some of these applications, WLAN users demand improved performance.

In a task group called IEEE 802.11ax, High Efficiency WLAN (HEW) standardization is under discussion. The HEW aims at improving performance felt by users demanding high-capacity and high-rate services. The HEW includes processes for clear channel assessment (CCA), where the stations determine whether the wireless medium is IDLE or BUSY. Increasing throughput in the WLAN is often focused on greater use of the wireless medium including identifying scenarios where stations can communicate without interfering with the communications of other stations and incorporating rules into the CCA that enable the identification of these scenarios.

SUMMARY

The embodiments provide a method of transmitting frames by a first station associated with a first basic service set (BSS) to manage interference amongst overlapping basic service sets (OBSSs). The first station detects a received frame on a wireless medium. The first station determines whether the received frame is from a second station, which is associated with a second BSS. The first station determines a received signal strength of the received frame. The first station determines that the received signal strength is below a first OBSS preamble detection level, where the first OBSS preamble detection level is associated with a first transmission power. The first station then sets the first transmission power as a maximum transmission power used by the first station for all frame transmissions during a time period. Where the first station does not determine that the received signal strength is below the first OBSS preamble detection level then the wireless medium is determined to be BUSY.

In a further embodiment, the first station is configured to implement another method of wireless medium assessment where the first station is associated with the first BSS to maximize spatial reuse of the wireless medium while limiting interference to OBSSs. The first station includes a radio frequency transmitter to communicate on the wireless medium. The radio frequency transmitter receives a received frame on the wireless medium. The first station further includes a processor communicatively coupled to the radio frequency transmitter. The processor executes a modified channel assessment module. The modified channel assessment module determines whether the received frame is associated with an OBSS. The modified channel assessment module determines whether the received frame has a signal strength below an adjusted OBSS preamble detection level, in response to the received frame being associated with the OBSS. The adjusted OBSS preamble detection level is lower than a reference OBSS preamble detection level. The modified channel assessment module sets, in response to determining that the signal strength is below the adjusted OBSS preamble detection level, the maximum transmission power of the station to an adjusted transmission power associated with the adjusted OBSS preamble detection level, where the maximum transmission power used by the station is used by the station for all frame transmissions during a time period.

BRIEF DESCRIPTION OF THE DRAWINGS

Embodiments are illustrated by way of example, and not by way of limitation, in the figures of the accompanying drawings in which like references indicate similar elements. It should be noted that different references to "an" or "one" embodiment in this specification are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

FIGS. 4A-C are diagrams of examples for handling OBSS interference where transmission power of the station (STA) is reduced to assess the wireless medium as IDLE for CCA.

FIG. 9 is a schematic block diagram exemplifying a transmitting signal processor in a WLAN device, according to some embodiments.

FIG. 10 is a schematic block diagram exemplifying a receiving signal processing unit in the WLAN, according to some embodiments.

DETAILED DESCRIPTION

Figure 1:
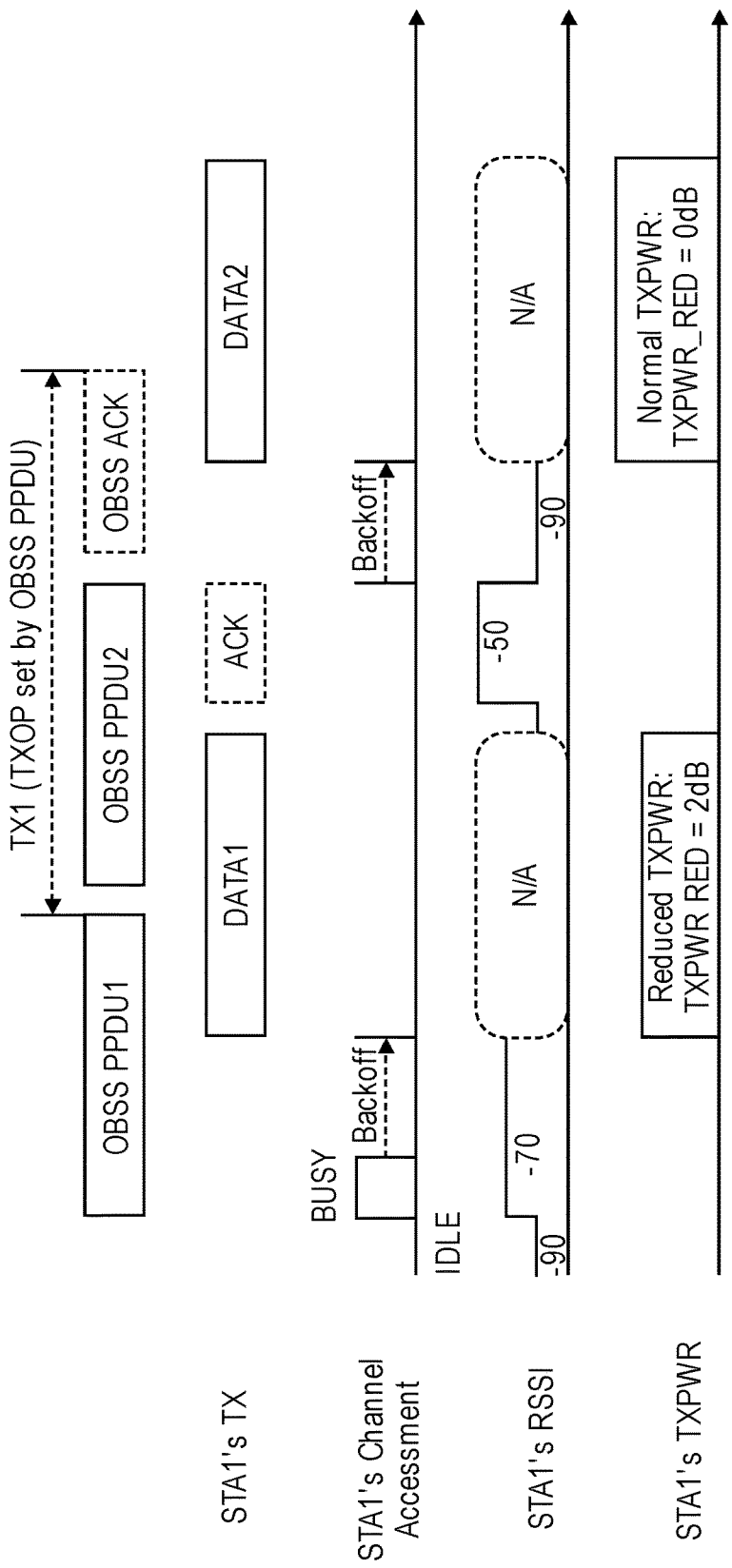
FIG. 1 is a diagram of one embodiment of an example operation where overlapping basic service set (OBSS) interference occurs.

The embodiments disclosed herein provide a method and system for improving spatial reuse in a clear channel assessment (CCA) process in a wireless local area network. The embodiments provide a process where a station (STA) lowers a transmission power with respect to a reference level. By lowering the transmission power, a corresponding overlapping basic service set preamble detection (OBSS_PD) threshold/level, which is used by the STA during CCA, may be increased. If the STA assesses a wireless channel to be "IDLE" during performance of CCA using this lowered transmission power and corresponding increased OBSS_PD level, then the STA will determine not to increase its transmission power above the lowered transmission power for at least a defined duration (T1). Thus, the STA will use the lowered transmission power or a lower level for all transmissions during T1. In this fashion, the STA's transmissions may avoid harming OBSS transmissions. The defined duration (T1) may be (1) a transmission opportunity (TXOP) duration of the ongoing OBSS frame, (2) a TXOP duration that the STA intends to set for an upcoming transmission using the lowered transmission power, (3) a duration that is longer than a packet duration that is currently occupying the wireless channel, or (4) a duration that is longer than a first packet duration where the first packet duration is a duration of a packet that the STA intends to transmit.

Further embodiments provide additional adjustments to the CCA process to reduce OBSS frame exchange interference. In a case where a STA assesses the wireless medium as "IDLE" with raised CCA threshold (e.g., OBSS_PD level) by lowering the transmission power of the STA with respect to a reference level, then the STA maintains a reduced until the backoff counter expires or the STA reassesses a wireless channel as BUSY. In another embodiment, when a STA assesses the wireless medium to be IDLE by reducing the STA's transmission power, the STA indicates in a transmitting frame that the responder of the transmitting frame should perform channel assessment before sending a response frame to the transmitting frame.

In the following description, numerous specific details are set forth. However, it is understood that embodiments may be practiced without these specific details. In other instances, well-known circuits, structures and techniques have not been shown in detail in order not to obscure the understanding of this description. It will be appreciated, however, by one skilled in the art that embodiments may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as non-transitory machine-readable media (e.g., machine-readable storage media such as magnetic disks, optical disks, read only memory, flash memory devices, phase change memory) and transitory machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more non-transitory machine-readable storage media (to store code for execution on the set of processors and data) and a set of one or more physical network interface(s) to establish network connections (to transmit code and/or data using propagating signals). Put another way, a typical electronic device includes memory comprising non-volatile memory (containing code regardless of whether the electronic device is on or off) and volatile memory (e.g., dynamic random access memory (DRAM), static random access memory (SRAM)), and while the electronic device is turned on that part of the code that is currently being executed is copied from the slower non-volatile memory into the volatile memory (often organized in a hierarchy) for execution by the processors of the electronic device.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Network devices or network elements can include access points (APs) and non-AP STAs in wireless communications systems such as a WLAN. STAs are devices connected to and communicating in a WLAN including client or user devices that connect to the WLAN via APs. APs are network devices that may be specialized wireless access points that can communicate with other network devices in the WLAN via the wireless medium or via wired connections. A STA or AP may be referred to herein as a WLAN device.

In distributed wireless networks, such as those defined by IEEE 802.11 standards, the wireless medium is shared by any number of STAs, and thus, channel sensing (i.e., performing CCA to determine if the wireless medium is available for transmission) is required before transmitting a frame. For the case of the "Listen Before Talk" CCA protocol defined in IEEE 802.11ax, a STA may assess channel IDLE, even if there's an ongoing frame in the wireless medium, by increasing an OBSS_PD level if the STA reduces its own transmission power. However, though the reduction of transmission power is defined for a single transmission, i.e., the transmission of a single frame during a current TXOP, if the STA transmits additional frames within the current TXOP without reducing the transmission power, the interference level to the OBSS STAs may be high and thus will result in packet reception failure in OBSS for the WLAN. In addition, in this scenario it is not clear how to manage backoff counter values and manage transmission power, because after identifying an OBSS frame there can be many different possible methods for handling the backoff counter value and transmission power.

Further, when mitigating packet collision while at the same time trying to enhance overall network performance, the modification of the OBSS_PD level adaptively based on the network environment helps the overall system performance, but should be indicated in a physical layer header of a transmitted frame to ensure each STA is aware of the adaptation. However, there are cases where a station that is a transmitter of a frame does not perform CCA, in which case the identification of a modified OBSS_PD level is not possible due to the lack of CCA information.

The embodiments provide an improved CCA process that addresses the issues described above. The embodiments are implemented at an apparatus (e.g., an AP STA, a non-AP STA, or another network or computing device) that includes one or more hardware and software logical structures for performing one or more of the operations described herein. For example, as described in greater detail herein, the apparatus may include a memory unit, which stores instructions that may be executed by a hardware processor installed in the apparatus. The apparatus may also include one or more other hardware or software elements, including a network interface, a display device, etc.

More specifically, the embodiments provide methods and systems for enabling robust spatial reuse such that system throughput can be improved by more channel access, and at the same time potential interference to OBSS STAs can be regulated. The IEEE 802.11 standard has limitations in the availability of the wireless medium and the embodiments described herein encompass various efforts to utilize more aggressive mechanisms for improving wireless medium availability such as altering the OBSS_PD level or utilizing more aggressive OBSS_PD levels under defined conditions that improve the availability of the wireless medium and thereby increase system throughput. However, altering (e.g., increasing) the OBSS_PD level may result in more frequent packet collisions and packet delivery Quality of Service (QoS) degradation. The above described degradation is particularly present when a network device (e.g., a STA or an AP) assesses the wireless medium and a frame that occupies the wireless medium is to and/or from a network device under the same basic service set (BSS) that the network device is associated with. For example, in a case where the OBSS_PD level is increased and a STA initiates a transmission to a serving AP, the transmission will not be successful because the AP is currently in the middle of transmission/reception with another STA.

To prevent such cases while still altering the OBSS_PD level to improve wireless availability, in some embodiments, the concept of a COLOR subfield in physical layer header (more specifically in a SIG field or more precisely the HE-SIG-A field) is relied upon. The COLOR subfield indicates the BSS that the transmitter (or receiver) of the frame belongs to. The COLOR subfield is smaller than a field that would be necessary for a full BSS to reduce the overhead in transmitting BSS information. Therefore, if COLOR information is provided in a transmitted frame, when a STA assesses the wireless medium and identifies a start of a frame, the STA can further check the COLOR subfield and identify the BSS that the transmitter (or receiver) of the frame belongs to. If the COLOR subfield matches with the COLOR of the STA's own BSS, then the STA will not initiate a transmission. However, if the COLOR subfield value is different from that of the STA's own BSS, the STA further checks the received signal strength level with a OBS_PD level, where if the OBSS_PD level is higher than minimum sensitivity level, then the STA will initiate a transmission only when the received signal strength level is lower than the OBSS_PD level.

Furthermore, to avoid interference to OBSS transmissions, the OBSS_PD level for OBSS frames may be accompanied by a set or defined relationship with a transmission power level of the STA. This relationship enables a reduction in the transmission power level to be accompanied by an increase in the OBSS_PD level. By making such an adjustment in transmission power level, those STAs that are willing to transmit a frame with lower transmission power can aggressively participate the wireless channel assessment.

An advantage gained by using a higher OBSS_PD level with a correlated lower transmission power is that interference caused by the transmission with reduced transmission power will be low, such that its interference to OBSS transmission is tolerable. However, such adjustments to transmission power of the STA create a new issue regarding the duration of the adjusted transmission power. When the STA uses the reduced transmission power and a STA increases the OBSS_PD level how long to maintain each of these settings will affect the possibility of collisions in the wireless medium. This problem becomes more serious when multiple frame transmission is allowed within a TXOP. For example, when a STA assesses a wireless channel as "IDLE" by increasing the OBSS_PD level with reduced transmission power, then the transmission should not interfere with frame reception by OBSS STA. However, by assessing the wireless channel as "IDLE," the STA may not update a network allocation vector (NAV) status based on the TXOP duration value of the OBSS PPDU. As a result, during the TXOP period of the OBSS PPDU, if the STA uses normal transmission power, its interference to the OBSS STA may be significant.

As used herein, a STA's transmission power can encompass a number of aspects of the transmission. A STA's transmission power can be the STA's actual transmission power (i.e., signal strength), a STA's transmission power can include the STA's maximum allowed transmission power, a STA's transmission power can include the STA's transmission power spectral density for actual transmission bandwidth, a STA's transmission power can include the STA's transmission power spectral density for the intended transmission bandwidth or similar definition. Thus, one skilled in the art would understand that any of these concepts of transmission power are encompassed in the term transmission power as used herein.

FIG. 1 is a diagram of one embodiment of an example operation where OBSS interference occurs. In this example, a minimum sensitivity level for carrier sensing is assumed to be −82 dBm, and the CCA level or OBSS_PD level is set at −72+transmission power reduction (TXPWR_RED) [dBm], where TXPWR_RED defines the amount of power reduction in transmission power compared to its maximum transmission power (STA1's TXPWR) measured in dBm. When a STA (STA1) intends to transmit a data frame (DATA1), STA1 assesses the wireless channel medium and finds a start of a data frame (OBSS PPDU1). In this example, the received signal level (−70 dBm) is above −82 dBm (STA1 received signal strength indicator (RSSI). Then, STA1 switches channel status from IDLE to BUSY and further checks if this received data frame is coming from its own BSS. When STA1 checks the physical layer (PHY) header and finds that the frame is coming from OBSS and its TXOP duration is TX1, as the received signal level (−70 dBm) is above the OBSS_PD level without reducing transmission power (−72 dBm), STA1 reduces the transmission power for 2 dB (TXPWR_RED=2 dB), such that it can meet the OBSS_PD level. STA1 changes the channel status from BUSY back to IDLE again, and keeps decreasing the backoff counter. As the backoff counter becomes 0, STA1 transmits its own data frame (DATA1). After transmitting the DATA1 data frame, the STA that is the responder for the DATA1 data frame sends an acknowledgement frame (ACK). At the same time, from the OBSS STA's perspective, after sending OBSS PPDU1 and OBSS PPDU2 sequentially, the responder for the OBSS PPDUs sends an acknowledgement (OBSS ACK). Thus, when STA1 seeks to transmit another data frame (DATA2) and assess the wireless channel again, the wireless channel remains IDLE since the responder for the OBSS PPDU is far away from STA1 and thus the received signal strength (−90 dBm) is below −82 dBm. Therefore, after the backoff counter becomes zero, STA1 transmits its own frame (DATA2) without decreasing transmission power. However, as the responder of OBSS ACK is close to STA1, STA1's second transmission without reducing the transmission power will cause significant interference, which results in a decoding failure of the OBSS ACK frame at the OBSS STA.

In this example, the decoding failure at the OBSS STA happens because STA1 does not decrease the transmission power when it transmits the DATA2 frame. However, this failure can be avoided if STA1 decreases the transmission power for the second transmission. STA1 is already aware that the TXOP duration for the OBSS transmission is up to TX1 when STA1 received the OBSS PPDU1. Under some CCA protocols, however, the TXOP duration information of the OBSS PPDU1 is ignored when, in this example, STA1 assesses the wireless channel medium as IDLE, even though it can be IDLE only when STA1 reduces its own transmission power.

To overcome the issues mentioned above, the embodiments provide systems and methods for channel sensing that modify these CCA protocols to avoid this and other issues. More specifically, the embodiments provide for a process where a STA, whose intended transmission power is decreased compared to its reference transmission power, assesses the wireless channel as IDLE, the STA's transmission power is set such that it cannot be increased above the intended (reduced) transmission power at least for the duration (T1) that the STA's transmission may harm OBSS frame exchange. In one example, the reference transmission power is a regular transmission power that the STA can use when no OBSS frame is detected and/or an OBSS is not proximate or interfering with operation of the STA.

The duration T1 may be a TXOP duration of the ongoing OBSS frame, a TXOP duration that the STA intends to set, longer than a currently received packet duration, longer than the end time for the transmission of the first PPDU from the STA or a similar duration. For some embodiments, along with the above mentioned concept, before T1 time ends, even if the STA identifies another OBSS frame and assesses the channel as IDLE without decreasing the transmission power, the STA still needs to maintain the decreased transmission power until T1. The use of a duration T1 where the TXOP duration is one that the STA intends to set ensures that the STA does not set its transmission power above the intended (reduced) transmission power.

Figure 2:
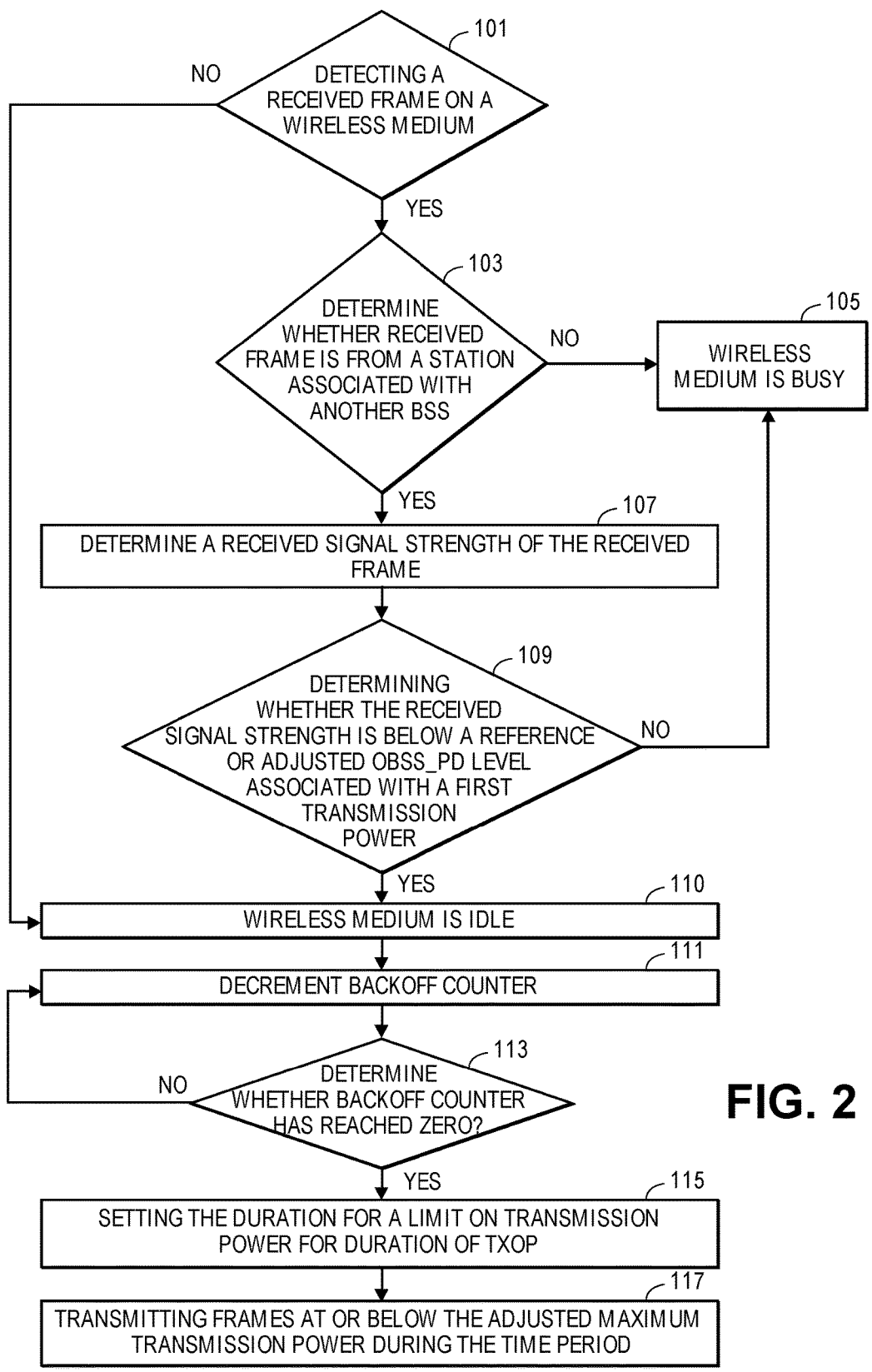
FIG. 2 is a flowchart of one embodiment of the process for managing transmission power adjustments for clear channel assessment (CCA).

FIG. 2 is a flowchart of one embodiment of a process for managing transmission power adjustments for CCA implemented by the STA. The flowchart sets forth a particular approach with specific implementations, modifications, variations and additions described further herein below. The flowchart describes the specific actions of the STA to implement the process, whereas the examples and additional embodiments provide a wider context of the operation not only of the STA implementing the modified channel assessment process, but also the other STAs and APs in the WLAN affected by the modifications.

The STA initiates the process when there is a frame that the STA is seeking to transmit to another STA or AP in the WLAN on a given wireless medium. The STA checks the wireless medium to determine if there is currently a frame being transmitted by another STA either in the same BSS or in an OBSS on the wireless medium (Block 101). If there is no frame detected on the wireless medium, then the wireless medium is determined to be IDLE (Block 110). This may encompass a check whether any received frame on the wireless medium exceeds a threshold level for detecting a frame where this threshold level is lower than or equal to the OBSS_PD level. In the case where the wireless medium is IDLE then the STA can continue to decrement its backoff counter (Block 111), if the backoff counter reaches zero (Block 113), then the STA can transmit its queued data frame on the wireless medium (Block 117). The detected signal strength must be over a threshold level to determine that the wireless medium is being used. If there is a transmission on the wireless medium then a determination is made whether the received frame is from a STA that is associated with the same BSS as the receiving STA or whether it is associated with another BSS, i.e., an OBSS (Block 103). If the frame is associated with the same BSS as the receiving STA then the wireless medium is assessed as BUSY (Block 105).

If the received frame is OBSS, then the STA determines the signal strength (e.g., RSSI) of the received frame (Block

107). A comparison of the signal strength of the received frame is then made with the OBSS_PD level associated with the transmission power of the STA. The inter-relationship of the OBSS_PD level and the transmission power is illustrated in FIG. 3.

Figure 3:
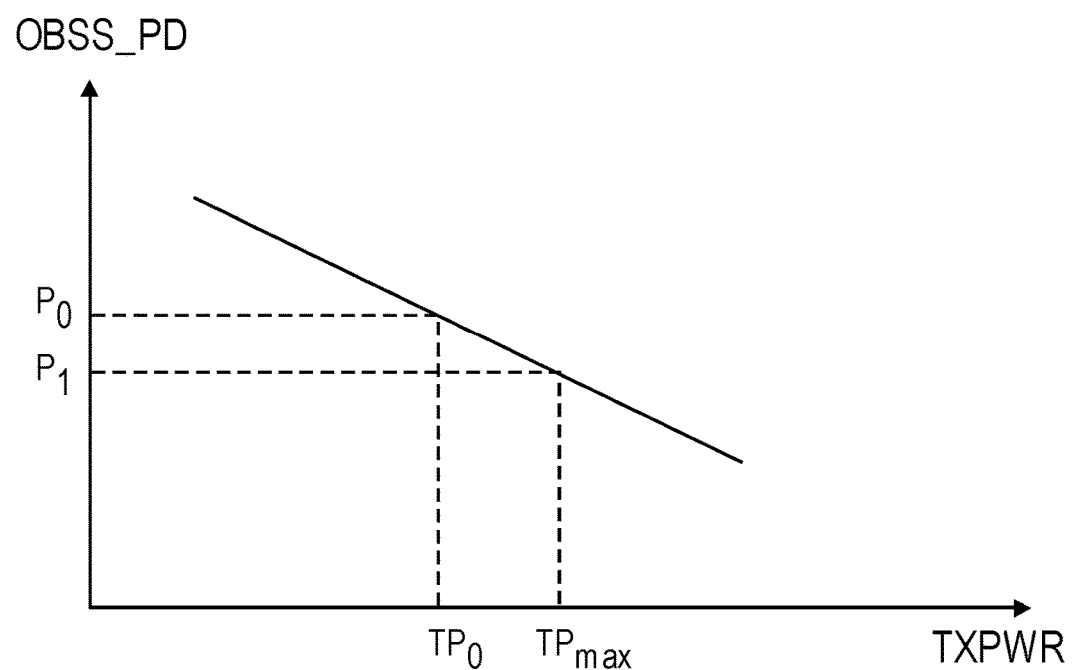
FIG. 3 is a diagram of one embodiment of the inter-relationships between transmission power and CCA threshold levels.

FIG. 3 is a diagram of one embodiment of the inter-relationships between transmission power and OBSS_PD levels. As mentioned above, the OBSS_PD level is not a fixed value but can depend on several factors. One of the factors is a transmission power of the STA. This association is shown in FIG. 3. The OBSS_PD level in this example is inversely proportional to the transmission power (TXPWR) of the STA. The illustration shows the relationship between the OBSS_PD level and transmission power for a frame as it is received at a STA. The frame has a received signal quality of P_0 when the STA assesses the wireless medium. In this example, the maximum transmission power of the STA is shown as TP_max. With the STA's maximum transmission power (TP_max), the correlated OBSS_PD level is P_1. When the received signal strength of the frame, P_0, is higher than the OBSS_PD level P_1 associated with TP_max, the STA may assess the wireless medium as BUSY and is not allowed to transmit its own frame. However, if the STA reduces its transmission power to TP_0 or below, then the OBSS_PD becomes P_0 or higher. If the received signal strength of a frame can be lower than the OBSS_PD level, then the STA can assess the wireless medium as IDLE and is allowed to transmit its own frame. An advantage of allowing higher OBSS_PD levels for reduced transmission power is that the interference level that the STA will cause can be reduced by decreasing the transmission power. Therefore, the STA can aggressively access the wireless medium while minimizing the resulting interference. The precise bounds of the OBSS_PD level and transmission power relationship can be governed by any algorithm that expresses the inverse relationship consistent with the likely interference with other STAs nearby.

Returning to FIG. 2, a determination is made whether the received signal strength is below a reference OBSS_PD level associated with the reference transmission power (Block 109). An adjusted OBSS_PD level can also be utilized that is associated with a lower transmission power than the reference transmission power. If the wireless medium cannot be classified/determined IDLE by using the adjusted OBSS_PD level and transmission power, then the wireless medium is designated as BUSY (Block 105). However, if the received signal strength is below either OBSS_PD level, then the wireless medium is determined to be IDLE (Block 110). As discussed above, when the wireless medium is IDLE then the process decrements the backoff counter (Block 111) until it reaches zero (Block 113).

If the wireless medium was assessed as IDLE based on an adjusted OBSS_PD then a determination is made as to the duration T1 limiting the change in transmission power (Block 115). The reference or adjusted transmission power is set as a maximum transmission power for frame transmissions during the time period T1. In various example embodiments, the limit T1 is any one of a TXOP duration of the ongoing OBSS frame, a TXOP duration that the STA intends to set, any duration longer than a currently receiving packet duration, any duration longer than the end time for the transmission of the first PPDU from the STA or a similar duration. Transmission of frames at or below the adjusted maximum transmission power continue for the time period T1 (Block 117). However, further refinements and alternate embodiments are further described herein.

One skilled in the art would appreciate that the operation of the STA as illustrated in the example of FIG. 2 can be modified consistent with the additional embodiments described herein and that the example of FIG. 2 is provided by way of illustration and not limitation.

In further embodiments, before T1 ends, if the STA identifies another OBSS frame and assesses the channel as IDLE without decreasing transmission power, the STA can transmit without decreasing transmission power even before T1 ends. In one embodiment, along with the above mentioned concept, if the STA has a non-zero NAV counter value (T0) when the STA identifies an OBSS frame, and the OBSS frame's TXOP duration is longer than the remaining NAV counter value (T0), then there may be multiple possible solutions available. These possible solutions can include a first solution for the above case where the STA sets an unconditional NAV to T0, and sets a conditional NAV to T1, such that the transmission at the adjusted transmission power can continue until T1. In a second solution for the above case, the STA sets the unconditional NAV to T1. In a third solution for the above case, the STA does not update the unconditional NAV.

In one embodiment, along with the above mentioned concept, a STA maintains a separate additional NAV update process (Conditional NAV). Here, the conditional NAV operation implies setting of the NAV under the condition that a STA's transmission power is reduced to a degree that corresponds to the OBSS_PD level when a STA assesses a wireless channel. In this case, the setting of virtual channel sensing depends on both the unconditional NAV and the conditional NAV. Virtual channel sensing criteria can be summarized as shown in below the table:

TABLE I

| Conditional NAV | Unconditional NAV | Channel Sensing |
|---|---|---|
| Not set | Not set | IDLE |
| Not set | Set | BUSY |
| Set | Not set | Conditional IDLE |
| Set | Set | BUSY |

In one embodiment, when a STA assesses the wireless channel and detects an OBSS frame and identifies its TXOP duration information, if the STA assesses the wireless medium as IDLE under the condition that the STA's transmission power level is below a given OBSS_PD level, then the transmission power level of the STA is restricted from exceeding the OBSS_PD level until the end of the identified TXOP duration.

FIG. 4A illustrates this embodiment where the transmission power is restricted for the duration of the TXOP. This example is described in reference to the timing diagram example of FIG. 1 with differences from that process described and highlighted. Similar to previous examples, a minimum sensitivity level for carrier sensing is assumed to be −82 dBm, and the OBSS_PD level is set at −72+TXPWR_RED [dBm], where TXPWR_RED defines the amount of power reduction in transmission power compared to the maximum transmission power measured in dBm. When a STA (STA1) intends to transmit a data frame (DATA1), the STA1 assesses the wireless channel medium and finds a start of a data frame (OBSS PPDU1) where the received signal level (−70 dBm) is above −82 dBm. Then, STA1 switches the channel status from IDLE to BUSY and further checks if this frame is coming from its own BSS. STA1 checks the PHY header and finds that the frame is coming from an OBSS and its TXOP duration is T1. Since the received signal level (−70 dBm) is above the OBSS_PD level without reducing transmission power (−72 dBm), STA1 reduces the transmission power by 2 dB (TXPWR_RED=2 dB), such that the received signal level can meet the OBSS_PD level. Because the received signal level meets the OBSS_PD level, STA1 changes the channel status from BUSY back to IDLE again, and keeps decreasing the backoff counter. When the backoff counter becomes 0, STA1 transmits its own data frame (DATA1). Since STA1 considers the wireless medium to be IDLE with its own transmission power reduced and STA1 has ignored the NAV from the OBSS PPDU, the STA1's transmission power is reduced at least 2 dB for at least the duration of the T1 period. Therefore, in this example, STA1 reduced the transmission power by 2 dB for frames occupying T1 duration (DATA1 and DATA2) and STA1 transmits without reducing transmission power (TXPWR_RED=0 dB) for frame transmission after the T1 duration (DATA3). By doing so, interference to OBSS STAs can be maintained under a manageable level.

In another embodiment, when a STA assesses the wireless channel and detects an OBSS frame, if the STA assesses the wireless medium as IDLE under the condition that the received signal strength of the OBSS frame does not exceed the OBSS_PD level for a correlated transmission power level, then the transmission power level of the STA is restricted to not exceed the OBSS_PD level for the TXOP duration that the STA sets.

FIG. 4B is an illustration of the embodiment where the transmission power level is limited such that the OBSS_PD level is not exceeded during the TXOP duration. Similar to the previous illustrated example, a minimum sensitivity level for carrier sensing is assumed to be −82 dBm, and the OBSS_PD level is set at −72+TXPWR_RED [dBm], where TXPWR_RED defines the amount of power reduction in transmission power compared to a reference transmission power measured in dB. When the STA (STA1) intends to transmit a frame (DATA1), the STA1 assesses the wireless channel medium and finds a start of a frame (OBSS PPDU1) where the received signal level (−70 dBm) is above −82 dBm. Then, STA1 switches the channel status from IDLE to BUSY and further checks if this frame is coming from its own BSS. When STA1 checks the PHY header and finds that the frame is coming from OBSS. Since the received signal level (−70 dBm) is above the OBSS_PD level without reducing transmission power (−72 dBm), STA1 reduces the transmission power by 2 dB (TXPWR_RED=2 dB), such that it can meet the OBSS_PD level. STA1 changes the channel status from BUSY back to IDLE again, and keeps decreasing the backoff counter. When the backoff counter becomes 0, STA1 transmits its own frame (DATA1). The STA considers the wireless medium to be IDLE based on its own reduced transmission power and has ignored the NAV from the OBSS PPDU. Thus, STA1's transmission power is limited to the reduced setting, reduced by at least 2 dB, for at least the duration of a TXOP (T2) that STA1 sets. Therefore, in this example, STA1 reduced the transmission power by 2 dB for frames occupying the T2 duration (DATA1 and DATA2). When STA1 intends to transmit another frame (DATA3) after T2 expires, then STA1 reassesses the wireless medium again while it invokes another backoff process. The transmission power of STA1 may be decided based on the new channel assessment results. In this example, since the wireless channel is IDLE during this backoff period, STA1 transmits a new frame (DATA3) without reducing transmission power (TXPWR_RED=0 dB). By doing so, interference to OBSS STA can be limited to a manageable level.

In another embodiment, a further variation is defined. In this variation, a STA assesses a wireless channel and detects an OBSS frame. If the STA assesses the wireless medium as IDLE where the STA's transmission power level is below OBSS_PD level, then the transmission power level of the STA is restricted from exceeding the OBSS_PD level until the STA performs another backoff or error recovery process, which will then require a further channel assessment.

Figure 4C:
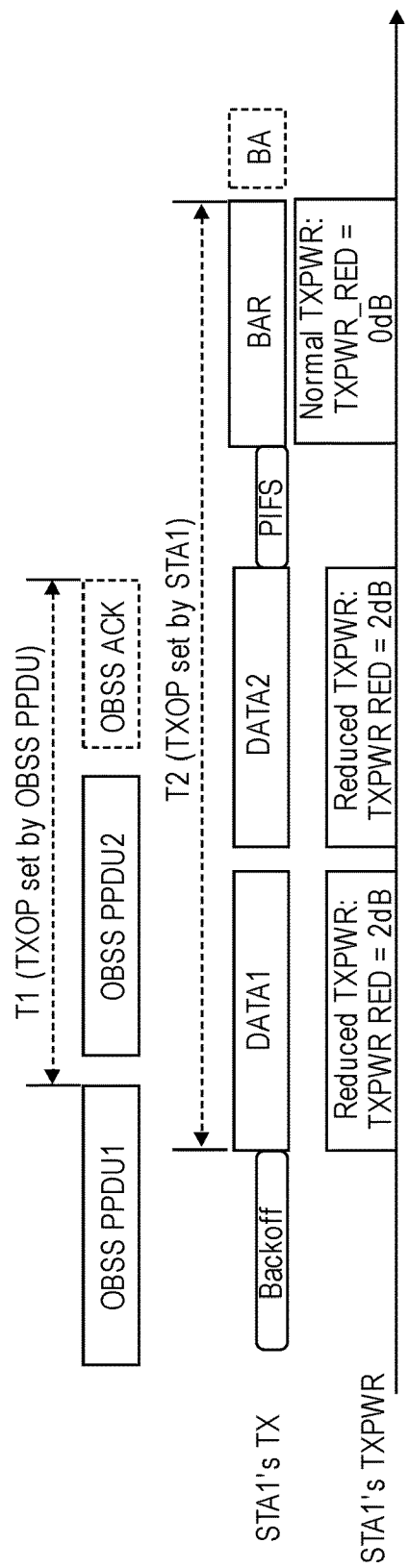

FIG. 4C is a diagram of this additional case where the transmission power is limited until the end of a backoff or error recovery process. Similar to previous examples, a minimum sensitivity level for carrier sensing is assumed to be −82 dBm, and the OBSS_PD level is set at −72+TXPWR_RED [dBm], where TXPWR_RED defines the amount of power reduction in transmission power compared to its maximum transmission power measured in dB. When a STA (STA1) intends to transmit a data frame (DATA1), the STA1 assesses wireless channel medium and finds a start of a frame (OBSS PPDU1) as the received signal level (−70 dBm) is above −82 dBm. Then, STA1 switches channel status from IDLE to BUSY and further checks if this frame is coming from its own BSS. When STA1 checks the PHY header and finds that the frame is coming from OBSS, as the received signal level (−70 dBm) is above the OBSS_PD level without reducing transmission power (−72 dBm), STA1 reduces the transmission power for 2 dB (TXPWR_RED=2 dB), such that it can meet the OBSS_PD level, and STA1 changes the channel status from BUSY back to IDLE again, and keeps decreasing the backoff counter. As the backoff counter becomes 0, STA1 transmits its own data frame (DATA1). Since the STA considers the wireless medium to be IDLE based on its own reduced transmission power and has ignored NAV from OBSS PPDU, STA1's transmission power for sequential transmission (DATA2) is limited to the reduced level of at least 2 dB. When STA1 transmits DATA2 data frame, STA1 may request an immediate block acknowledgement response and waits for the block acknowledgment (BA) frame. However, if there's no response received during a predetermined time (T3), STA1 considers its transmission failed and performs Point Inter-Frame Space (PIFS) recovery, which implies that STA1 transmits a Block Acknowledgement Request (BAR) frame if the wireless channel is IDLE during PIFS time prior to its transmission. As wireless channel is IDLE during new channel assessment, STA1 transmits a BAR frame without reducing transmission power (TXPWR_RED=0 dB). By doing so, interference to OBSS STAs can be maintained at a manageable level.

The embodiments also encompass variations of the process and system to address problems caused when the interference level fluctuates after a OBSS frame is recognized. These cases are addressed in reference to FIGS. 5A-5J, which show example diagrams for various fluctuating scenarios and methods for handling these fluctuations. For example, when a STA assesses a wireless channel as "IDLE" by increasing the OBSS_PD level with a reduced transmission power, quite a lot of different situations can happen such as the OBSS frame disappears during backoff period, the interference signal power increases during backoff period, and another OBSS frame is detected with different received power level during backoff period, as examples.

Figure 5A:
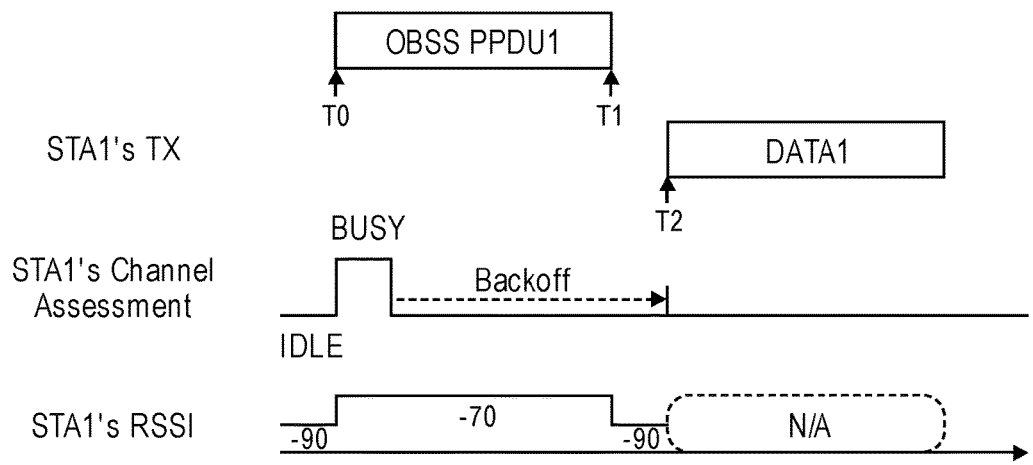
FIGS. 5A-5J are diagrams of embodiments for handling fluctuations in the strength of received transmissions on a wireless medium to improve spatial reuse.

FIG. 5A is a diagram that illustrates an example operation where the OBSS interference level fluctuates. In this example, a minimum sensitivity level for carrier sensing is assumed to be −82 dBm, and the OBSS_PD level is set at −72+TXPWR_RED [dBm], where TXPWR_RED defines the amount of power reduction in transmission power compared to its maximum transmission power measured in dB. When a STA (STA1) intends to transmit a data frame (DATA1), the STA1 assesses the wireless channel medium and finds a start of a frame (OBSS PPDU1) at time T0 as the received signal level (−70 dBm) is above −82 dBm. Then, STA1 switches channel assessment status from IDLE to BUSY and further checks if this frame is coming from its own BSS. When STA1 checks the PHY header, the STA1 finds that the frame is coming from the OBSS, and the received signal level (−70 dBm) is above the OBSS_PD level without reducing transmission power (−72 dBm). STA1 reduces the transmission power for 2 dB (TXPWR_RED=2 dB), such that it can meet the OBSS_PD level. STA1 changes the channel status from BUSY back to IDLE again, and keeps decreasing the backoff counter (after appropriate interframe space (IFS) time if needed). At time T1, before the backoff counter expires, the transmission of the OBSS frame (OBSS PPDU1) finishes and the received power at STA1 goes down to −90 dBm, which is below a minimum sensitivity level for carrier sensing. And, at time T2 the backoff counter of STA1 expires. Then, it is not clear in this case how STA1 is to determine the appropriate transmission power level because the received signal level between T1 and T2 is different from the received signal level when STA1 detects a start of the data frame.

To overcome the issues mentioned above, the embodiments of the systems and methods for managing STA transmission power are further modified. Specifically, in this scenario, once a STA assesses the wireless medium as IDLE with a raised OBSS_PD level (by decreasing transmission power), the STA maintains the reduced transmission power even in the case where the ongoing OBSS frame ends before the backoff counter expires. In one embodiment, once a STA assesses a wireless medium as IDLE with a raised OBSS_PD level (by decreasing transmission power), the STA limits transmission power to the reduced transmission power until the backoff counter expires. In another embodiment, once a STA assesses a wireless medium as IDLE with a raised OBSS_PD level (by decreasing transmission power), the STA limits transmission power to the reduced transmission power until the backoff counter expires or the STA reassesses channel as "BUSY." In another embodiment, a STA can adjust transmission power as long as it can meet the OBSS_PD level during backoff time.

In one embodiment, when a STA detects a data frame on the wireless medium when the STA's channel status is IDLE, the STA changes the channel status to BUSY and further checks if the frame is an inter-BSS (or OBSS) frame or not by using BSS color (or media access control (MAC) address in the MAC header). If the detected frame is an inter-BSS frame and the received signal strength is below a first threshold value, the STA changes the channel status from BUSY to IDLE, wherein the first threshold value is a function of reduction in the STA's transmission power. If the detected frame is an inter-BSS frame and the received signal strength is below a first threshold value with at least a first reduction in the STA's transmission power during backoff period, the STA's transmission power shall not be greater than the STA's reference transmission power subtracted by the first reduction (in dB).

In one embodiment, when a STA detects more than one frame when the STA's channel status is IDLE during backoff process, the STA changes the channel status to BUSY and further checks if the frame is an inter-BSS (or OBSS) frame or not by using BSS color (or MAC address in the MAC header) for each detection of the frame. If the detected frame is an inter-BSS frame and the received signal strength is below a OBSS_PD level, the STA changes the channel status from BUSY to IDLE, wherein the OBSS_PD level is a function of reduction in the STA's transmission power for each detection of the frame. If the last detected frame during a backoff process is an inter-BSS frame and the received signal strength is below a first OBSS_PD level with at least a first reduction in the STA's transmission power during backoff period, the STA's transmission power is limited to be no greater than the STA's maximum transmission power subtracted by the first reduction (in dB).

Figure 5B:
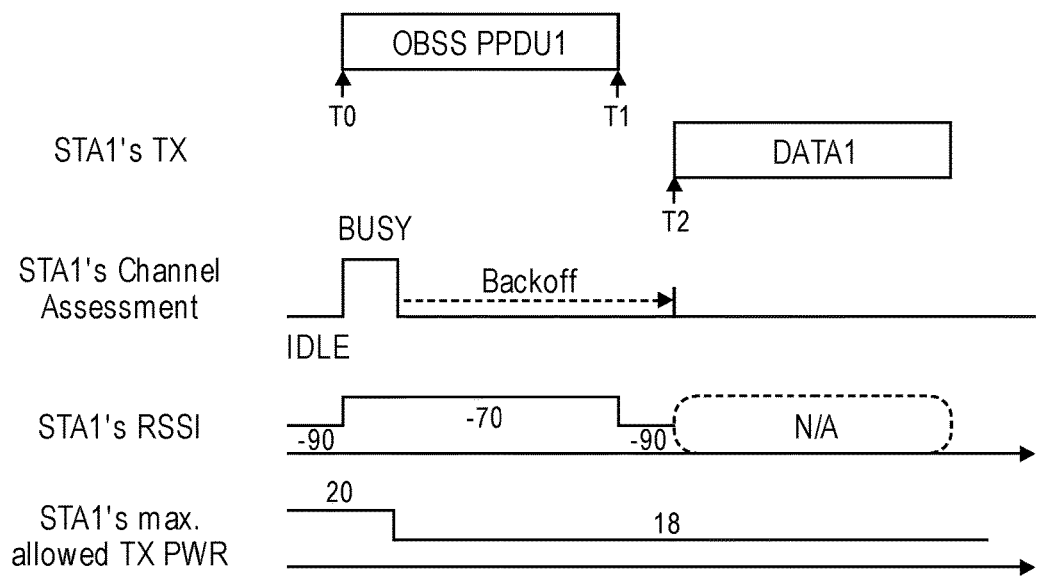

FIG. 5B is a diagram that illustrates an example operation of the above mentioned embodiments. In this example, similar to the above example, a minimum sensitivity level for carrier sensing is assumed to be −82 dBm, and the OBSS_PD level is set at −72+TXPWR_RED [dBm], where TXPWR_RED defines the amount of power reduction in transmission power compared to its maximum transmission power measured in dB. And, STA1's maximum transmission power is 20 dBm. When a STA (STA1) intends to transmit a frame (DATA1), the STA1 assesses wireless channel medium and finds a start of a frame (OBSS PPDU1) at time T0 because the received signal level (−70 dBm) is above −82 dBm. Then, STA1 switches channel assessment status from IDLE to BUSY and further checks if this frame is coming from its own BSS. When STA1 checks the PHY header, the STA1 finds that the frame is coming from OBSS, and the received signal level (−70 dBm) is above the OBSS_PD level without reducing transmission power (−72 dBm). STA1 reduces the transmission power by 2 dB (TXPWR_RED=2 dB) to 18 dBm, such that it can meet the OBSS_PD level. STA1 changes the channel status from BUSY back to IDLE again, and keeps decreasing the backoff counter (after appropriate interframe space (IFS) time if needed). At time T1, before the backoff counter expires, the transmission of the OBSS frame (OBSS PPDU1) finishes and the received power at STA1 goes down to −90 dBm, which is below the minimum sensitivity level for carrier sensing. However, STA1's maximum allowed transmission power is still maintained to 18 dBm, as backoff counter has not been reached to zero (or channel status remains in IDLE). And, at time T2 the backoff counter of STA1 expires and STA1 transmits its data frame (DATA1) with up to 18 dBm transmission power.

Figure 5C:
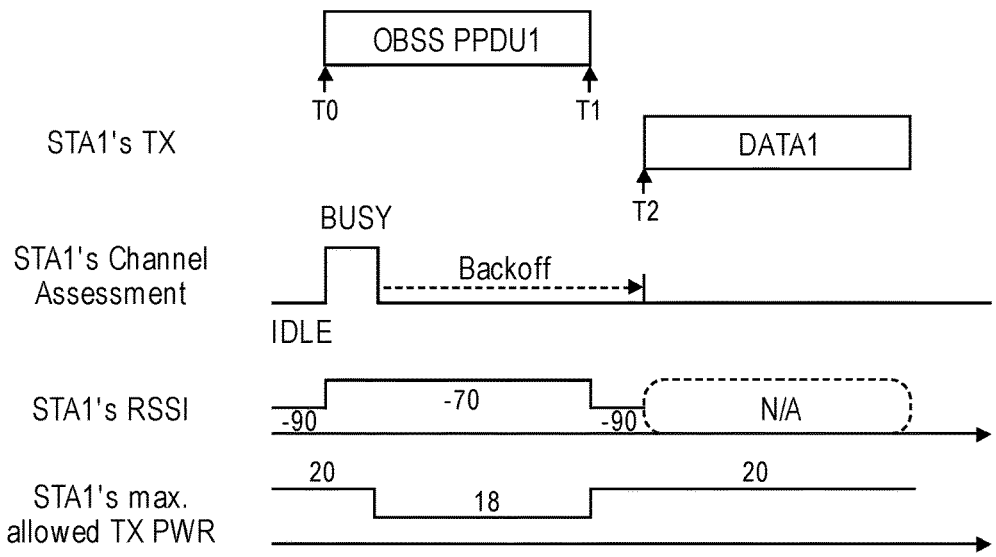

FIG. 5C is a diagram that illustrates an example operation of the above mentioned embodiments. In this example, similar to above example, the minimum sensitivity level for carrier sensing is assumed to be −82 dBm, and the OBSS_PD level is set at −72+TXPWR_RED [dBm], where TXPWR_RED defines the amount of power reduction in transmission power compared to its maximum transmission power measured in dB. STA1's maximum transmission power is 20 dBm. When a STA (STA1) intends to transmit a frame (DATA1), the STA1 assesses wireless channel medium and finds a start of a frame (OBSS PPDU1) at time T0 as the received signal level (−70 dBm) is above −82 dBm. Then, STA1 switches channel assessment status from IDLE to BUSY and further checks if this frame is coming from its own BSS. When STA1 checks the PHY header, the STA1 finds that the frame is coming from OBSS, and the received signal level (−70 dBm) is above the OBSS_PD level without reducing transmission power (−72 dBm). STA1 reduces the transmission power 2 dB (TXPWR_RED=2 dB) to 18 dBm, such that it can meet the OBSS_PD level. STA1 changes the channel status from BUSY back to IDLE again, and keeps decreasing the backoff counter (after appropriate interframe space (IFS) time if needed). At time T1, before the backoff counter expires, the transmission of the OBSS frame (OBSS PPDU1) finishes and the received power at STA1 goes down to −90 dBm, which is below the minimum sensitivity level for carrier sensing. Then, as the received signal level (−90 dBm) is below the OBSS_PD level without reducing transmission power (−72 dBm), STA1 recovers the transmission power back to its maximum value, 20 dBm. At time T2 the backoff counter of STA1 expires and STA1 transmits its frame (DATA1) with up to 20 dBm transmission power.

Figure 5D:
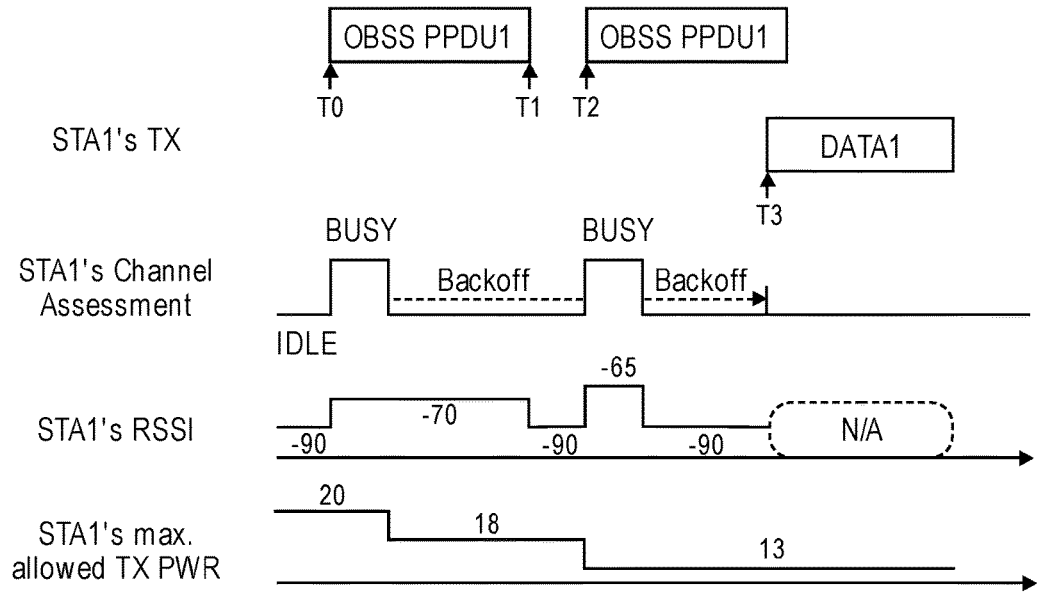

FIG. 5D is a diagram that illustrates another example operation of the above mentioned embodiments. In this example, similar to the above example, a minimum sensitivity level for carrier sensing is assumed to be −82 dBm, and OBSS_PD is set at −72+TXPWR_RED [dBm], where TXPWR_RED defines the amount of power reduction in transmission power compared to its maximum transmission power measured in dB. STA1's maximum transmission power is 20 dBm. When a STA (STA1) intends to transmit a data frame (DATA1), the STA1 assesses the wireless channel medium and finds a start of a frame (OBSS PPDU1) at time T0 because the received signal level (−70 dBm) is above −82 dBm. Then, STA1 switches the channel assessment status from IDLE to BUSY and further checks if this data frame is coming from the STAs own BSS. When STA1 checks the PHY header, STA1 finds that the frame is coming from OBSS, and the received signal level (−70 dBm) is above the OBSS_PD level without reducing transmission power (−72 dBm). STA1 reduces the transmission power by 2 dB (TXPWR_RED=2 dB) to 18 dBm, such that it can meet the OBSS_PD level, and STA1 changes the channel status from BUSY back to IDLE again, and keeps decreasing the backoff counter (after appropriate interframe space (IFS) time if needed). At time T1, before the backoff counter expires, the transmission of the OBSS frame (OBSS PPDU1) finishes and the received power at STA1 goes down to −90 dBm, which is below minimum sensitivity level for carrier sensing. When STA1 continues assessing the wireless medium while decrementing the backoff counter, at time T2, STA1 finds another start of a frame (OBSS PPDU2) whose received signal level is −65 dBm. Then, STA1 switches the channel assessment status from IDLE to BUSY and further checks if this frame is coming from its own BSS. When STA1 checks the PHY header, the STA1 finds that the frame is coming from OBSS, and the received signal level (−65 dBm) is above the OBSS_PD level (−70 dBm) with current transmission power reduction value (TXPWR_RED=2 dB). STA1 reduces the transmission power by 5 dB more (TXPWR_RED=7 dB) to 13 dBm, such that it can meet the OBSS_PD level. STA1 changes the channel status from BUSY back to IDLE again, and keeps decreasing the backoff counter (after appropriate interframe space (IFS) time if needed). At time T3, the backoff counter of STA1 expires and STA1 transmits its data frame (DATA1) with up to 13 dBm transmission power.

Figure 5E:
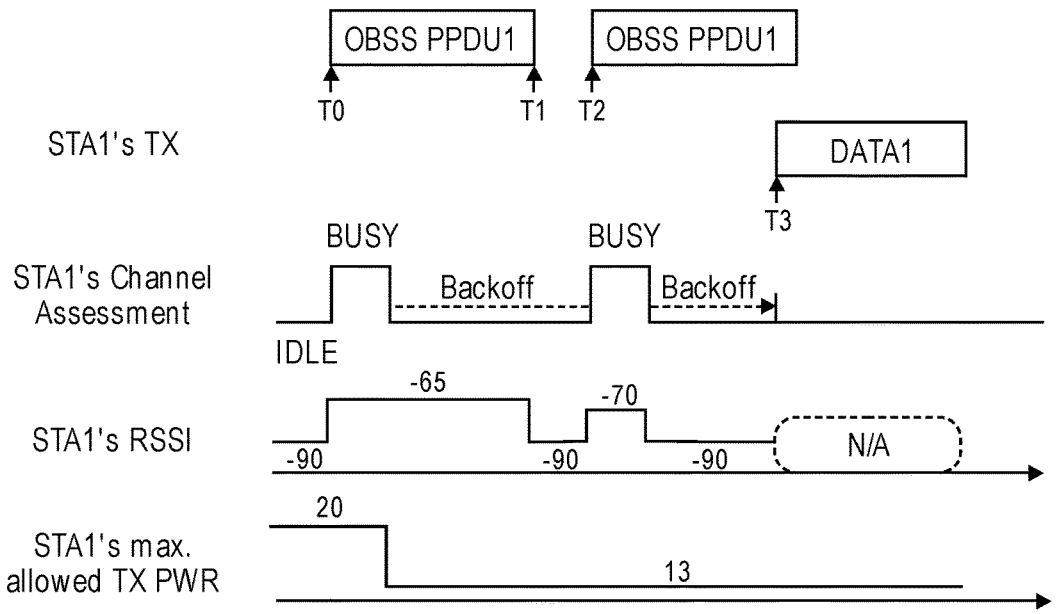

FIG. 5E is a diagram that illustrates another example operation of the above mentioned embodiments. In this example, similar to the above examples, a minimum sensitivity level for carrier sensing is assumed to be −82 dBm, and the OBSS_PD is set at −72+TXPWR_RED [dBm], where TXPWR_RED defines the amount of power reduction in transmission power compared to its maximum transmission power measured in dB. STA1's maximum transmission power is 20 dBm. When a STA (STA1) intends to transmit a data frame (DATA1), the STA1 assesses the wireless channel medium and finds a start of a data frame (OBSS PPDU1) at time T0 as the received signal level (−65 dBm) is above −82 dBm. Then, STA1 switches channel assessment status from IDLE to BUSY and further checks if this data frame is coming from its own BSS. When STA1 checks the PHY header, the STA1 finds that the frame is coming from OBSS, and the received signal level (−65 dBm) is above the OBSS_PD threshold level without reducing transmission power (−72 dBm). STA1 reduces the transmission power 7 dB (TXPWR_RED=7 dB) to 13 dBm, such that it can meet the OBSS_PD level, STA1 changes the channel status from BUSY back to IDLE again, and keeps decreasing the backoff counter (after appropriate interframe space (IFS) time if needed). At time T1, before the backoff counter expires, the transmission of the OBSS frame (OBSS PPDU1) finishes and the received power at STA1 goes down to −90 dBm, which is below the minimum sensitivity level for carrier sensing. When STA1 continues assessing the wireless medium, while decrementing the backoff counter, at time T2, STA1 finds another start of a frame (OBSS PPDU2) whose received signal level is −70 dBm. STA1 switches the channel assessment status from IDLE to BUSY and further checks if this data frame is coming from its own BSS. When STA1 checks the PHY header, the STA1 finds that the frame is coming from OBSS, and the received signal level (−70 dBm) is below the OBSS_PD level (−65 dBm) with the current transmission power reduction value (TXPWR_RED=7 dB). STA1 maintains the maximum allowed transmission power level (13 dBm) as it can meet the OBSS_PD level. STA1 changes the channel status from BUSY back to IDLE again, and keeps decreasing the backoff counter (after appropriate interframe space (IFS) time if needed). At time T3, the backoff counter of STA1 expires and STA1 transmits its frame (DATA1) with up to 13 dBm transmission power.

Figure 5F:
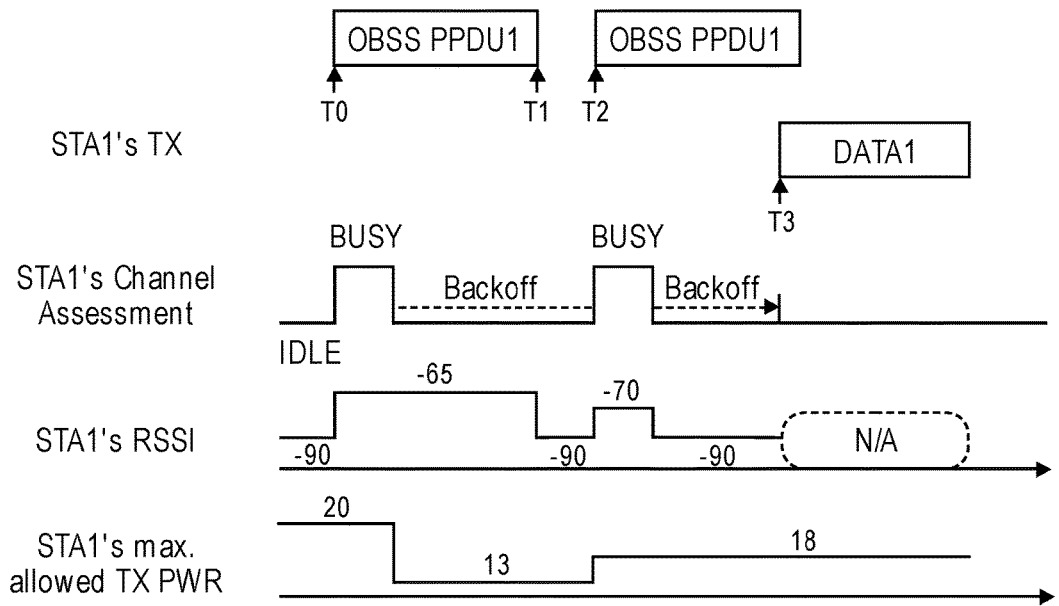

FIG. 5F is a diagram that illustrates another example operation of the above mentioned embodiments. In this example, similar to the above examples, the minimum sensitivity level for carrier sensing is assumed to be −82 dBm, and the OBSS_PD level is set at −72+TXPWR_RED [dBm], where TXPWR_RED defines the amount of power reduction in transmission power compared to its maximum transmission power measured in dB. STA1's maximum transmission power is 20 dBm. When a STA (STA1) intends to transmit a data frame (DATA1), the STA1 assesses the wireless channel medium and finds a start of a frame (OBSS PPDU1) at time T0 since the received signal level (−65 dBm) is above −82 dBm. Then, STA1 switches channel assessment status from IDLE to BUSY and further checks if this frame is coming from its own BSS. When STA1 checks the PHY header, the STA1 finds that the frame is coming from OBSS, and the received signal level (−65 dBm) is above the OBSS_PD level without reducing transmission power (−72 dBm). STA1 reduces the transmission power by 7 dB (TXPWR_RED=7 dB) to 13 dBm, such that it can meet the OBSS_PD level. STA1 changes the channel status from BUSY back to IDLE again, and keeps decreasing the backoff counter (after appropriate interframe space (IFS) time if needed). At time T1, before the backoff counter expires, the transmission of the OBSS frame (OBSS PPDU1) finishes and the received power at STA1 goes down to −90 dBm, which is below minimum sensitivity level for carrier sensing. When STA1 continues assessing the wireless medium while decrementing the backoff counter, at time T2, STA1 finds another start of a frame (OBSS PPDU2) whose received signal level is −70 dBm. Then, STA1 switches channel assessment status from IDLE to BUSY and further checks if this frame is coming from its own BSS. When STA1 checks the PHY header, the STA1 finds that the frame is coming from OBSS, and the received signal level (−70 dBm) is above the OBSS_PD level without reducing transmission power (−72 dBm). STA1 reduces the transmission power 2 dB from the maximum transmission power level (TXPWR_RED=2 dB) to 18 dBm, such that it can meet the OBSS_PD level. STA1 changes the channel status from BUSY back to IDLE again, and keeps decreasing the backoff counter (after appropriate interframe space (IFS) time if needed). At time T3, the backoff counter of STA1 expires and STA1 transmits its frame (DATA1) with up to 18 dBm transmission power.

Figure 5G:
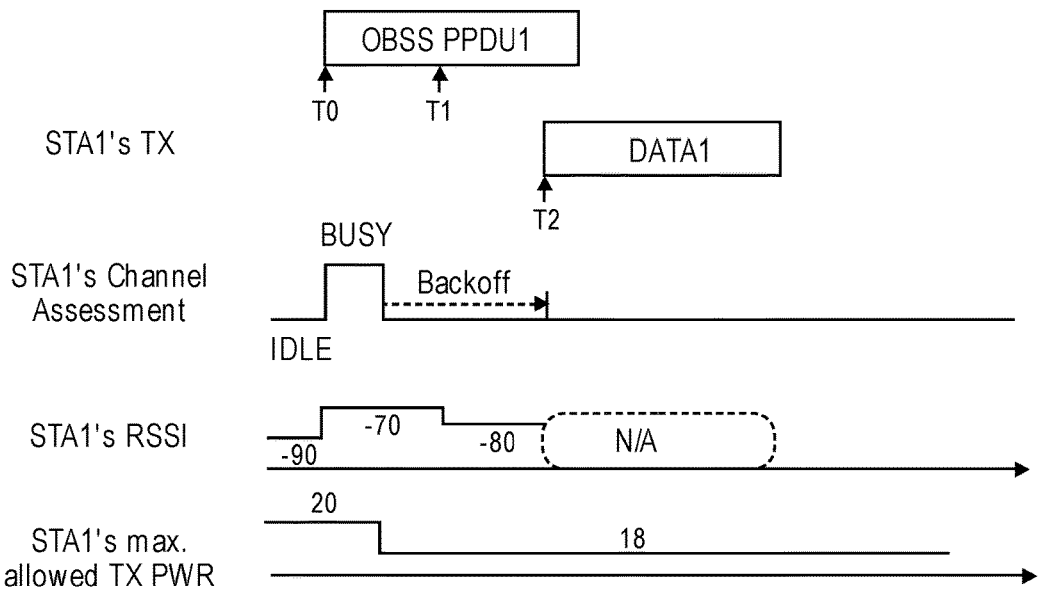

FIG. 5G is a diagram that illustrates an example operation of the above mentioned embodiments. In this example, similar to the above example, the minimum sensitivity level for carrier sensing is assumed to be −82 dBm, and the OBSS_PD level is set at −72+TXPWR_RED [dBm], where TXPWR_RED defines the amount of power reduction in transmission power compared to its maximum transmission power measured in dB. STA1's maximum transmission power is 20 dBm. When a STA (STA1) intends to transmit a data frame (DATA1), the STA1 assesses wireless channel medium and finds a start of a frame (OBSS PPDU1) at time T0 since the received signal level (−70 dBm) is above −82 dBm. Then, STA1 switches channel assessment status from IDLE to BUSY and further checks if this frame is coming from its own BSS. When STA1 checks the PHY header, the STA1 finds that the frame is coming from OBSS, and the received signal level (−70 dBm) is above the OBSS_PD level without reducing the transmission power (−72 dBm). STA1 reduces the transmission power by 2 dB (TXPWR_RED=2 dB) to 18 dBm, such that it can meet the OBSS_PD level, STA1 changes the channel status from BUSY back to IDLE again, and keeps decreasing the backoff counter (after appropriate interframe space (IFS) time if needed). At time T1, before the backoff counter expires, the received power level for OBSS PPDU1 is decreased to −80 dBm. However, STA1's maximum allowed transmission power is still maintained at 18 dBm, as the backoff counter has not been reached to zero (or channel status remains in IDLE). At time T2, the backoff counter of STA1 expires and STA1 transmits its data frame (DATA1) with up to 18 dBm transmission power.

Figure 5H:
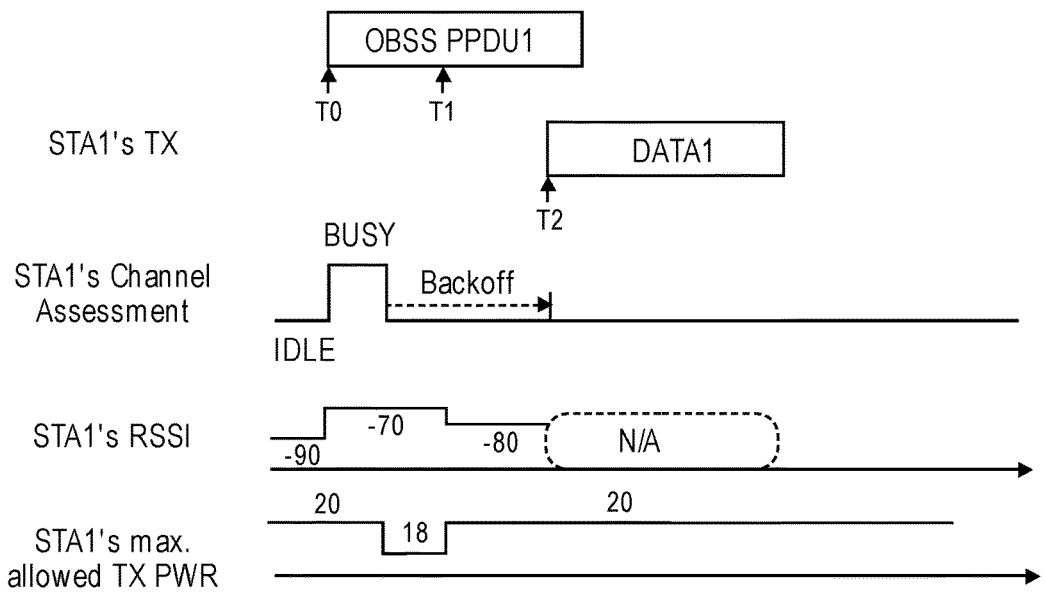

FIG. 5H is a diagram that illustrates an example operation of the above mentioned embodiments. In this example, similar to the above examples, the minimum sensitivity level for carrier sensing is assumed to be −82 dBm, and the OBSS_PD level is set at −72+TXPWR_RED [dBm], where TXPWR_RED defines the amount of power reduction in transmission power compared to its maximum transmission power measured in dB. STA1's maximum transmission power is 20 dBm. When a STA (STA1) intends to transmit a data frame (DATA1), the STA1 assesses the wireless channel medium and finds a start of a frame (OBSS PPDU1) at time T0 as the received signal level (−70 dBm) is above −82 dBm. Then, STA1 switches the channel assessment status from IDLE to BUSY and further checks if this data frame is coming from its own BSS. When STA1 checks the PHY header, the STA1 finds that the frame is coming from OBSS, and the received signal level (−70 dBm) is above the OBSS_PD level without reducing transmission power (−72 dBm). STA1 reduces the transmission power by 2 dB (TXPWR_RED=2 dB) to 18 dBm, such that it can meet the OBSS_PD level, and STA1 changes the channel status from BUSY back to IDLE again. STA1 keeps decreasing the backoff counter (after appropriate interframe space (IFS) time if needed). At time T1, before the backoff counter expires, the received power level for OBSS PPDU1 is decreased to −80 dBm (due to BF or channel environment change, etc.). Then, as the received signal level (−80 dBm) is below the OBSS_PD level without reducing transmission power (−72 dBm), STA1 resets the transmission power back to its maximum value, 20 dBm. At time T2, the backoff counter of STA1 expires and STA1 transmits its data frame (DATA1) with up to 20 dBm transmission power.

Figure 5I:
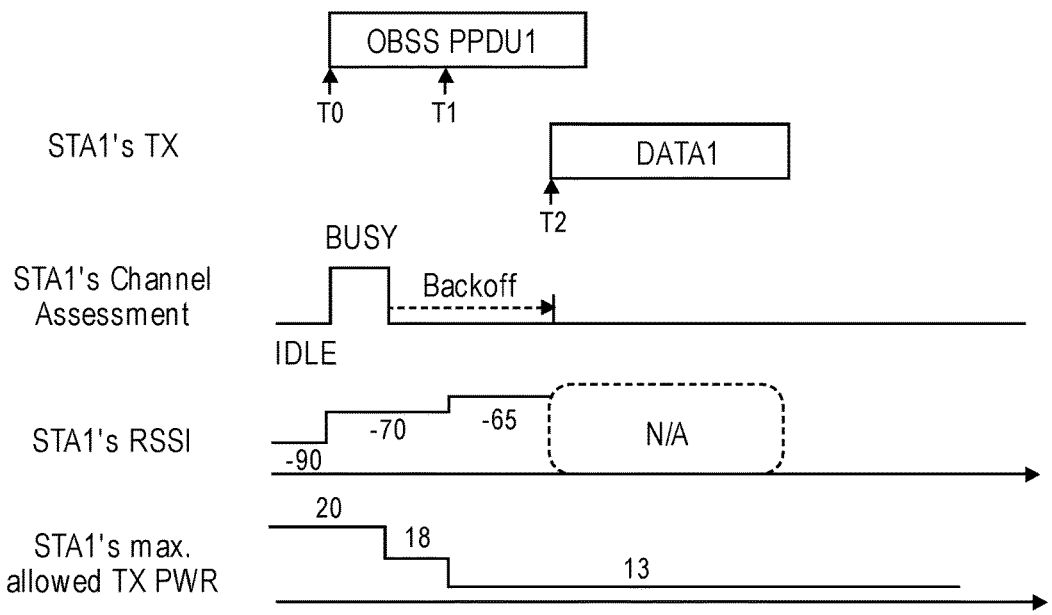

FIG. 5I is a diagram that illustrates further operation of the above mentioned embodiments. In this example, similar to the above example, the minimum sensitivity level for carrier sensing is assumed to be −82 dBm, and the OBSS_PD level is set at −72+TXPWR_RED [dBm], where TXPWR_RED defines the amount of power reduction in the transmission power compared to its maximum transmission power measured in dB. STA1's maximum transmission power is 20 dBm. When a STA (STA1) intends to transmit a data frame (DATA1), the STA1 assesses the wireless channel medium and finds a start of a frame (OBSS PPDU1) at time T0 as the received signal level (−70 dBm) is above −82 dBm. Then, STA1 switches the channel assessment status from IDLE to BUSY and further checks if this frame is coming from its own BSS. When STA1 checks the PHY header, the STA1 finds that the frame is coming from OBSS, the received signal level (−70 dBm) is above OBSS_PD level without reducing transmission power (−72 dBm). STA1 reduces the transmission power by 2 dB (TXPWR_RED=2 dB) to 18 dBm, such that it can meet the OBSS_PD level. STA1 changes the channel status from BUSY back to IDLE again, and keeps decreasing the backoff counter (after appropriate interframe space (IFS) time if needed). At time T1, before the backoff counter expires, the received power level for OBSS PPDU1 is increased to −65 dBm (due to BF or channel environment change, etc.). Because the received signal level (−65 dBm) is above the OBSS_PD level (−70 dBm) with the current transmission power reduction value (TXPWR_RED=2 dB), STA1 reduces the transmission power by 5 dB more (TXPWR_RED=7 dB) to 13 dBm, such that it can meet the OBSS_PD level, and STA1 maintains the channel status as IDLE. STA1 keeps decreasing the backoff counter. At time T3, the backoff counter of STA1 expires and STA1 transmits its frame (DATA1) with up to 13 dBm transmission power.

Figure 5J:
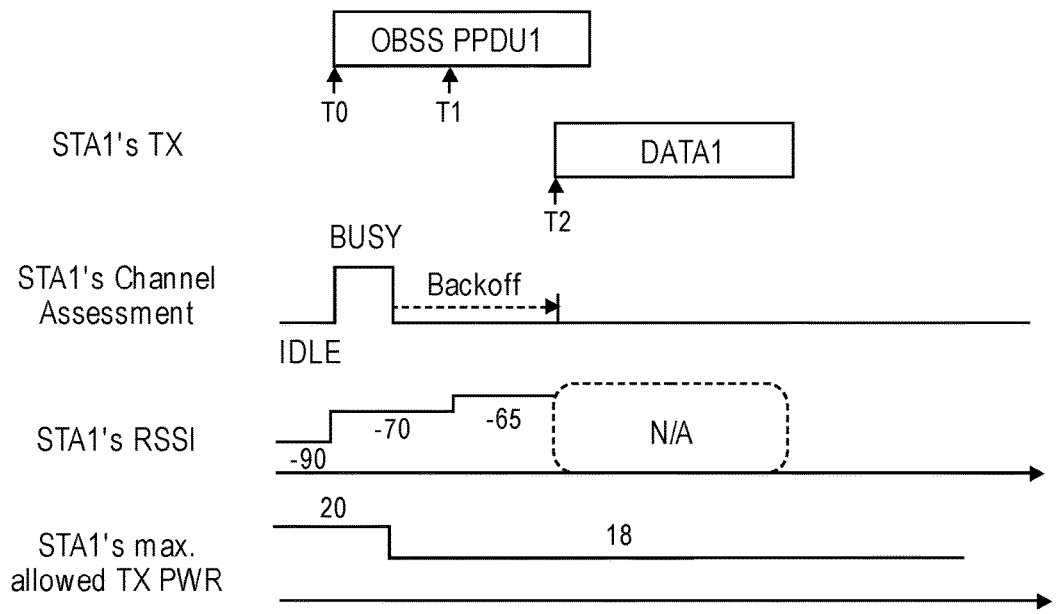

FIG. 5J is a diagram that illustrates further operation of the above mentioned embodiments. In this example, similar to the above examples, the minimum sensitivity level for carrier sensing is assumed to be −82 dBm, and the OBSS_PD level is set at −72+TXPWR_RED [dBm], where TXPWR_RED defines the amount of power reduction in the transmission power compared to its maximum transmission power measured in dB. STA1's maximum transmission power is 20 dBm. When a STA (STA1) intends to transmit a data frame (DATA1), the STA1 assesses the wireless channel medium and finds a start of a frame (OBSS PPDU1) at time T0 as the received signal level (−70 dBm) is above −82 dBm. Then, STA1 switches the channel assessment status from IDLE to BUSY and further checks if this frame is coming from its own BSS. When STA1 checks the PHY header, the STA1 finds that the frame is coming from OBSS, and the received signal level (−70 dBm) is above the OBSS_PD level without reducing transmission power (−72 dBm). STA1 reduces the transmission power by 2 dB (TXPWR_RED=2 dB) to 18 dBm, such that it can meet the OBSS_PD level. STA1 changes the channel status from BUSY back to IDLE again, and keeps decreasing the backoff counter (after appropriate interframe space (IFS) time if needed). At time T1, before the backoff counter expires, the received power level for OBSS PPDU1 is increased to −65 dBm (due to BF or channel environment change, etc.). However, STA1's maximum allowed transmission power is still limited to 18 dBm, because the backoff counter has not reached zero (or the channel status remains IDLE). At time T2, the backoff counter of STA1 expires and STA1 transmits its data frame (DATA1) with up to 18 dBm transmission power.

Further embodiments provide a modification to minimize the interference caused by response frames or acknowledgements. Even though the STA can transmit its own frame by reducing its transmission power while the wireless medium is used by other STAs, referred to as SR (Spatial Reuse) transmission, and thus the interference caused by this SR transmission can be maintained to a certain level, a response frame for this transmission can cause another unanticipated interference because the transmitting STA of the response frame does not check the OBSS_PD level and does not adjust its transmission power for the response frame transmission.

In an example WLAN, a station (STA3) intends to transmit a frame to another station (STA4) while a further station (STA1) is transmitting a frame to a station (STA2). In this example, STA3 can assess the wireless medium as IDLE only with its transmission power reduced. Therefore, the STA3 initiates its data frame transmission to STA4 with reduced transmission power. In SIFS time after successfully receiving the data frame at STA4, STA4 sends back an Acknowledgement frame (ACK) to STA3. In IEEE 802.11 protocol, when a STA transmits back a control response frame, the STA does not perform CCA and the STA does not consider NAV. Therefore, STA4 sends back ACK frame to STA3 without considering NAV and without considering the state of the wireless medium. As STA4 does not consider the wireless channel status, STA4 may use its maximum transmission power. As STA3 initiates the SR transmission with reduced transmission power such that its transmission may not severely damage ongoing transmissions from STA1 to STA2, if STA4 transmits the ACK frame with maximum transmission power, the interference caused by STA4's ACK frame transmission to STA2's reception can be significantly decrease the reception performance at STA2.

To improve the above mentioned issues related to acknowledgements and response frames, systems and methods for channel assessment and transmit power control in shared wireless medium are improved. More specifically, the methods that enable lowering interference coming from response frame of an SR transmission are provided.

The basic concept is that in case where a STA assesses a wireless medium as IDLE, even though there's an ongoing frame, by reducing its transmit power and transmitting a first frame, the first frame includes an indication that a response frame to the first frame needs to be sent in a way that does not hurt the on-going frame. With this starting concept, there are lots of different embodiments available without loss of the core concept, and there are lots of possible variations depending on different usage scenarios. Some of example variations are listed (but not limited to) (1) when a STA initiates an uplink multiuser (UL MU) transmission while there's an ongoing frame occupying a wireless medium, the STA sends a Trigger frame wherein the Trigger frame indicates that all participating STAs for UL MU transmission shall perform CCA before UL MU transmission. Out of the scheduled STAs for UL MU transmission, only those STAs that receive the Trigger frame correctly and CCA assessment is IDLE send UL frames simultaneously in predetermined time after receiving the Trigger frame. (2) When a STA initiates a frame transmission while there's an ongoing frame occupying a wireless medium, the STA indicates in the frame such that the responding STA's transmission power needs to be adjusted when the responding STA transmits a response frame to the frame. (3) When a STA initiates a frame transmission while there's an ongoing frame occupying a wireless medium, the STA indicates in the frame such that the responding STA shall perform CCA before response frame transmission. (4) When a STA transmits a response frame in predetermined time after receiving a first frame, and if the STA is required to do CCA, the threshold value for Energy Detection is a function of the STA's transmission power.

Figure 6A:
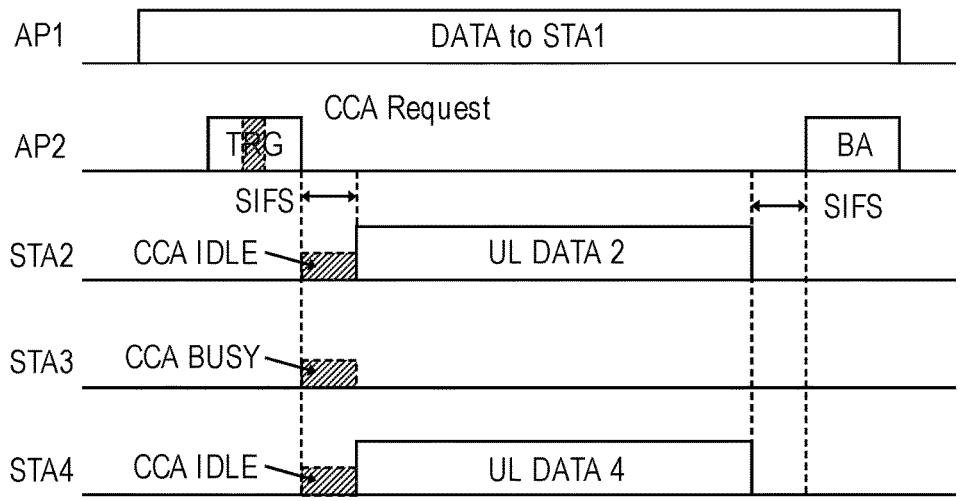
FIGS. 6A, 6B and 6C are diagrams of embodiments for managing transmission power during acknowledgements to reduce interference on the wireless medium.

FIG. 6A is a diagram that illustrates one example operation of the process and system for addressing the acknowledgement and response frame issue. In this example, AP2 intends to initiate an UL MU transmission with STA2/STA3/STA4 while AP1 is transmitting a frame to STA1. AP2 identifies a start of a frame, sent by AP1, and identifies that this frame originated from an OBSS and the received signal strength of the frame is below a first OBSS_PD level. Then, AP2 assesses the wireless medium as IDLE. After AP2's backoff counter expires, AP2 transmits a Trigger frame (TRG) that initiates an UL MU transmission. The Trigger frame comprises information that STA2/STA3/STA4 are scheduled for UL MU transmission. AP2 transmits the Trigger frame while AP1 is occupying the wireless channel (SR transmission). AP2 further indicates a first information (CCA Request) in the Trigger frame that the scheduled STAs shall perform CCA before UL MU transmission. Scheduled STAs (STA2/STA3/STA4) that correctly receive the Trigger frame, where the first information in the Trigger frame indicates that CCA is required, perform CCA after receiving the Trigger frames for a predetermined time duration (SIFS in this example). During this time, STA2 and STA4 assess the wireless medium as IDLE, but STA3 assesses the wireless medium as BUSY. Therefore, even though STA2/STA3/STA4 are scheduled for UL MU transmission, only STA2 and STA4 transmit UL frames (UL DATA 2/4) to the serving AP. A predetermined time after receiving the UL frames, AP2 sends back acknowledgement frame to STA2 and STA4.

As shown in this example, as STA2/STA3/STA4 are allowed to transmit an UL frame as a response to the Trigger frame only when CCA assesses the medium as IDLE, the interference from the response frame can be minimized to the frame delivery between AP1 and STA1. In one embodiment, the information shall be included in a Trigger frame if an AP transmits the Trigger frame while the AP identifies a start of an OBSS frame. In another embodiment, the information shall be included in a Trigger frame if an AP transmits the Trigger frame while the AP identifies a start of an OBSS frame and the AP assesses wireless medium as IDLE with reduced transmit power.

In one embodiment, the information is delivered in a media access control (MAC) protocol data unit (MPDU) that includes Trigger information within the Trigger frame. In one embodiment, the information is delivered in the physical layer header part of the Trigger frame.

Figure 6B:
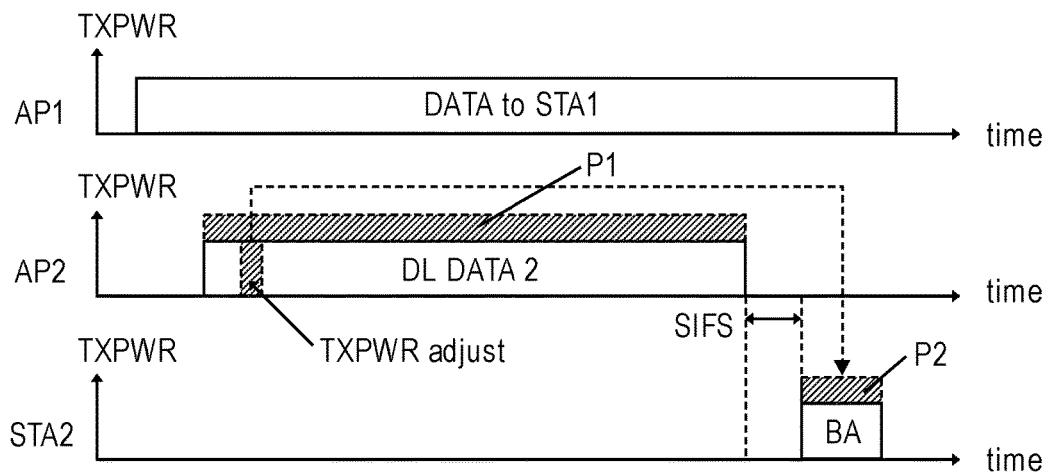

FIG. 6B is a diagram that illustrates another example operation of the process for addressing acknowledgement and response frames. In this example, AP2 intends to initiate a frame transmission (DL DATA 2) to STA2 while AP1 is transmitting a frame to STA1. AP2 identifies a start of a frame, sent by AP1 AP2 also identifies that this frame is originated from an OBSS and the received signal strength of the frame is above a first OBSS_PD level. Then, AP2 assesses the wireless medium as IDLE by reducing its transmission power, because the first OBSS_PD level is inversely proportional to the transmission power and the received signal strength of the frame is below the first OBSS_PD level with transmission power reduction of P1. After AP2's backoff counter expires, AP2 transmits a data frame (DL DATA 2) to STA2 with reduced transmit power and there is a first indication (transmission power adjust) in the data frame that indicates information on the transmit power level of the response frame. In predetermined time (SIFS in this example) after successfully receiving the data frame, STA2 transmits a block acknowledgement frame with adjusted transmit (reduced by P2) power in accordance with the first indication.

As shown in this example, because STA2's transmit power for the response frame is controlled by AP2, when AP2 is allowed to initiate a frame exchange with reduced transmit power, the interference from the response frame can be minimized to the frame delivery between AP1 and STA1. In one embodiment, the first indication is included in the physical layer header part of the data frame. In another embodiment, the first indication is included in MPDU of the data frame. In one embodiment, the first indication is composed of more than one states regarding the transmission power level of the responding frame, wherein at least one of the states represents reduced power. In another embodiment, the first indication is one bit of information which indicates if the responding STA needs transmit power reduction or not. In another embodiment, the first indication indicates the level of power reduction in dB scale from a first reference level. In one embodiment, the first reference level is the maximum transmit power of the responding STA. In another embodiment, the first reference level is a fixed value.

Figure 6C:
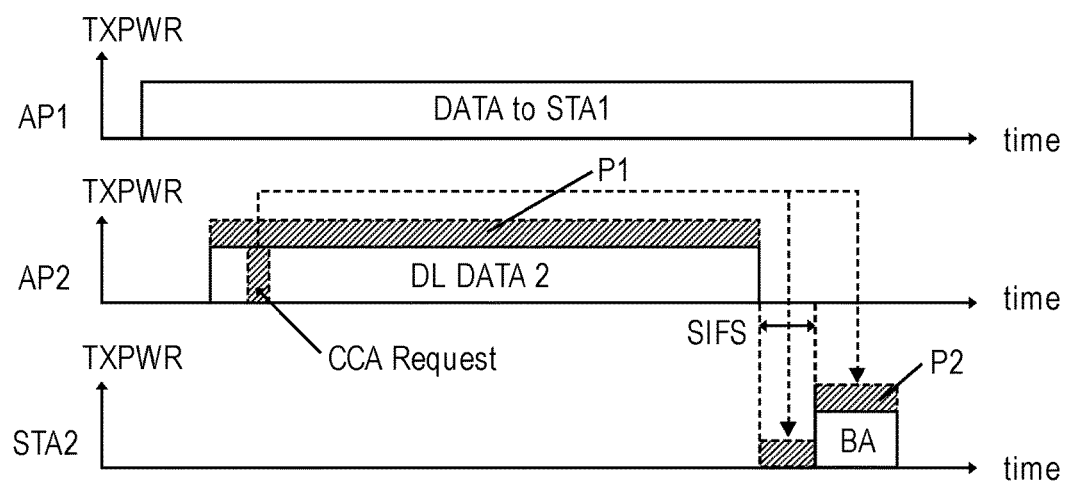

FIG. 6C is a diagram that illustrates another example embodiment. In this example, AP2 intends to initiate a frame transmission (DL DATA 2) to STA2 while AP1 is transmitting a frame to STA1. AP2 identifies a start of a frame, sent by AP1, and identifies that this frame originates from an OBSS and the received signal strength of the frame is above a first OBSS_PD level. Then, AP2 assesses the wireless medium as IDLE by reducing its transmission power, because the first threshold value is inversely proportional to the transmission power and the received signal strength of the frame is below the first OBSS_PD level with a transmission power reduction of P1. After AP2's backoff counter expires, AP2 transmits a data frame (DL DATA 2) to STA2 with a reduced transmission power. There is a first indication (CCA Request) in the data frame that the responding STA of the data frame shall perform energy detection (ED) type CCA before transmitting the response frame. A second threshold value for the ED type CCA is inversely proportional to the transmit power of the response frame. ED type CCA detects a channel BUSY condition when the received signal strength exceeds the second threshold level. In predetermined time (SIFS in this example) after successfully receiving the data frame, STA2 performs energy detection ED type CCA. STA2 assesses the wireless medium as IDLE with reducing its transmission power, because the second OBSS_PD level is inversely proportional to the transmission power and the received signal strength of the frame is below the second OBSS_PD level with transmission power reduction of P2. Then, STA2 transmits an acknowledgement frame (BA) with adjusted transmit (reduced by P2) power.

As shown in this example, because STA2's transmitting power for the response frame is controlled by AP2, when AP2 is allowed to initiate a frame exchange with reduced transmit power, the interference from the response frame can be minimized to the frame delivery between AP1 and STA1. In one embodiment, the first indication is included in the physical layer header part of the data frame. In another embodiment, the first indication is included in MPDU of the data frame. In one embodiment, the first indication indicates at least two groups of states, wherein the first group implies that CCA is not required before sending back the response frame and the second group implies that CCA is required before sending back the response frame. In one embodiment, the first indication indicates if CCA is required before sending back the response frame and the first indication further indicates an information related with the second threshold value. In another embodiment, the first indication indicates if CCA is required before sending back the response frame and the first indication further indicates an information related with the second threshold value that is in accordance with the AP2's transmit power.

In one embodiment, the second OBSS_PD level for ED type CCA is a function of a STA's transmit power if a first condition is met. However, the second OBSS_PD level for ED type CCA is not a function of a STA's transmit power if the first condition is not met. In another embodiment, the first condition is met if the STA transmits a response frame in response to a frame that is sent with reduced transmission power. In another embodiment, the first condition is met if the STA transmits a response frame in response to a frame that comprises an indication that CCA is required before sending the response frame. In another embodiment, the first condition is met if the STA transmits a response frame in response to a frame that comprises an indication that transmit power of the response frame needs an adjustment.

The embodiments of the invention provide advantages over the art. The embodiments can increase system throughput by allowing spatial reuse and can control transmission power for response frames such that packet collision due to response frame transmission can be reduced when frames are transmitted in spatial reuse manner. The embodiments provide methods and systems that provide more robust transmission with high spatial reuse, more fairness allowed among multiple STAs, and overall network throughput increase.

Figure 7:
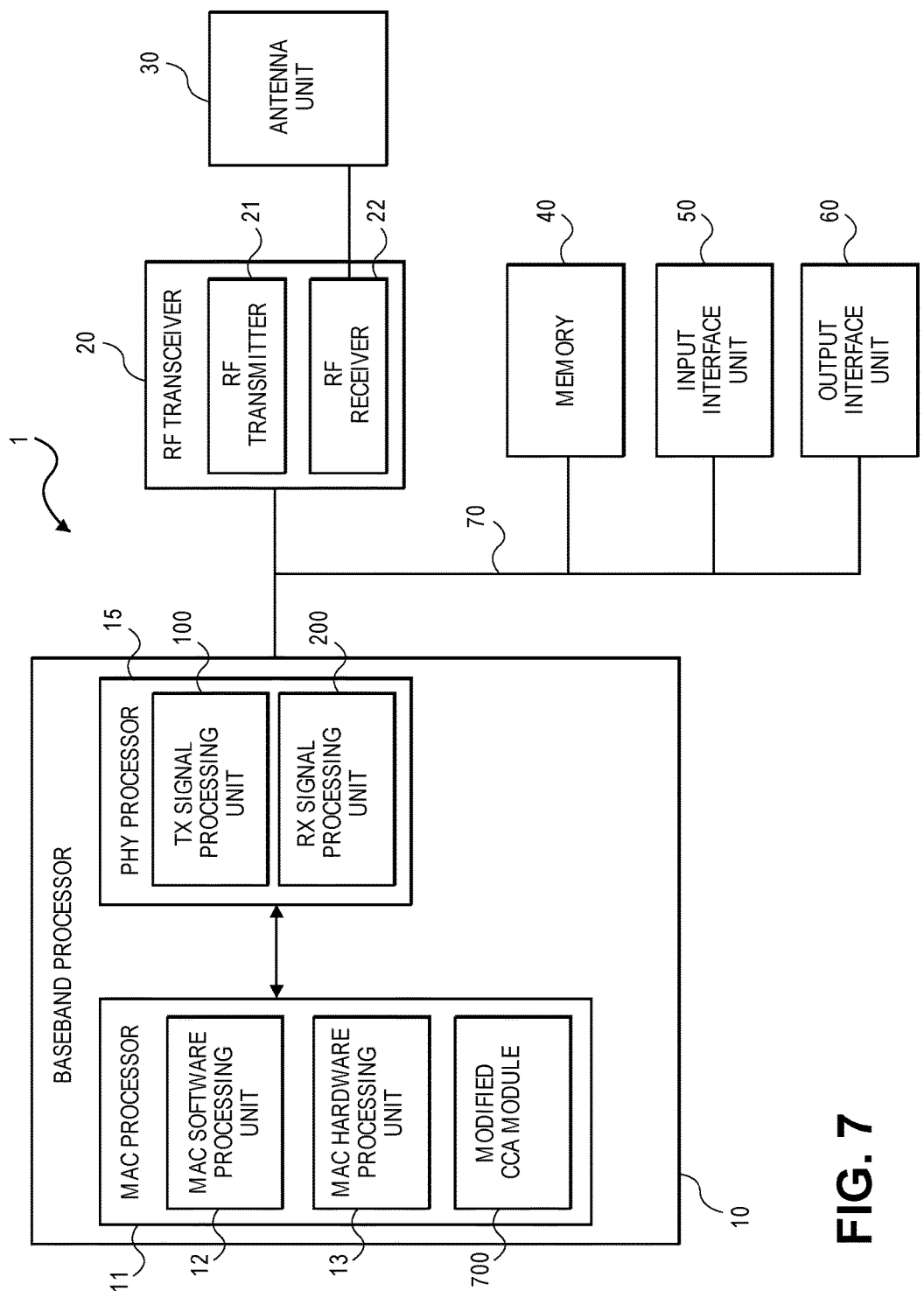
FIG. 7 is a block diagram of a network device implementing a STA or AP that executes a random access process and module, according to some embodiments.
Figure 8:
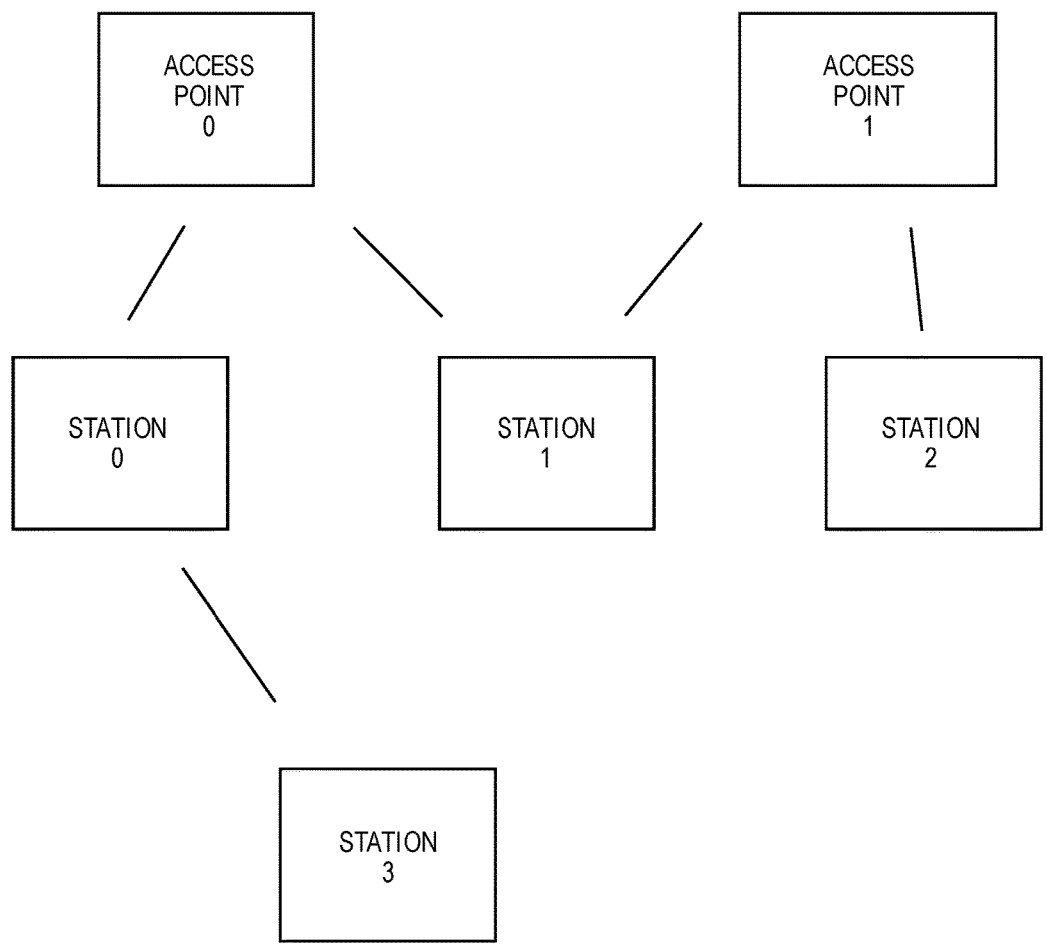
FIG. 8 is a block diagram of a WLAN, according to some embodiments.

FIG. 7 is a block diagram of a network device implementing a STA or AP that executes a random access process and module, according to some embodiments. In a wireless local area network (WLAN) such as the example WLAN illustrated in FIG. 8, a basic service set (BSS) includes a plurality of network devices referred to herein as WLAN devices. Each of the WLAN devices may include a medium access control (MAC) layer and a physical (PHY) layer according to IEEE 802.11 standard. In the plurality of WLAN devices, at least one WLAN device may be an AP station (e.g., access point 0 and access point 1 in FIG. 8) and the other WLAN devices may be non-AP stations (non-AP STAs), (e.g., stations 0-3 in FIG. 8). Alternatively, all of the plurality of WLAN devices may be non-AP STAs in an Ad-hoc networking environment. In general, the AP STA and the non-AP STA may be each referred to herein as a station (STA). However, for ease of description, only the non-AP STA will be referred to herein as a STA whereas the AP stations are referred to herein as APs for ease of description. As shown in FIG. 8, a WLAN can have any combination of STAs and APs that can form a discrete network, an ad hoc network or any combination thereof. Any number of APs and STAs can be included in a WLAN and any topology and configuration of such APs and STAs in the network can be utilized.

The example WLAN device 1 includes a baseband processor 10, a radio frequency (RF) transceiver 20, an antenna unit 30, memory 40, an input interface unit 50, an output interface unit 60, and a bus 70. The baseband processor 10 performs baseband signal processing, and includes a MAC processor 11 and a PHY processor 15. These processors can be any type of integrated circuit (IC) including a general processing unit or an application specific integrated circuit (ASIC). In some embodiments, the MAC processor 11 also executes the modified channel assessment module 700. The modified channel assessment module 700 can implement the respective functions for any combination of the embodiments described herein above with regard to FIGS. 1-6. In other embodiments, the modified channel assessment module 700 may be implemented by or distributed over both the PHY processor 15 and the MAC processor 11. The modified channel assessment module 700 may be implemented as software or as hardware components of either the PHY processor 15 or MAC processor 11.

In one embodiment, the MAC processor 11 may include a MAC software processing unit 12 and a MAC hardware processing unit 13. The memory 40 may store software (hereinafter referred to as "MAC software"), including at least some functions of the MAC layer. The MAC software processing unit 12 executes the MAC software to implement some functions of the MAC layer and the MAC hardware processing unit 13 may implement the remaining functions of the MAC layer in hardware (hereinafter referred to "MAC hardware"). However, the MAC processor 11 is not limited to this distribution of functionality.

The PHY processor 15 includes a transmitting signal processing unit 100 and a receiving signal processing unit 200 described further herein below with reference to FIGS. 9 and 10.

The baseband processor 10, the memory 40, the input interface unit 50, and the output interface unit 60 may communicate with each other via the bus 70. The radio frequency (RF) transceiver 20 includes an RF transmitter 21 and an RF receiver 22. The memory 40 may further store an operating system and applications. In some embodiments, the memory may store recorded information about captured frames. The input interface unit 50 receives information from a user and the output interface unit 60 outputs information to the user.

The antenna unit 30 includes one or more antennas. When a MIMO or MU-MIMO system is used, the antenna unit 30 may include a plurality of antennas.

FIG. 9 is a schematic block diagram exemplifying a transmitting signal processor in a WLAN device, according to some embodiments. Referring to the above drawing, a transmitting signal processing unit 100 includes an encoder 110, an interleaver 120, a mapper 130, an inverse Fourier transformer (IFT) 140, and a guard interval (GI) inserter 150. The encoder 110 encodes input data. For example, the encoder 110 may be a forward error correction (FEC) encoder. The FEC encoder may include a binary convolutional code (BCC) encoder followed by a puncturing device or may include a low-density parity-check (LDPC) encoder.

The transmitting signal processing unit 100 may further include a scrambler for scrambling the input data before encoding to reduce the probability of long sequences of 0s or 1s. If BCC encoding is used in the encoder 110, the transmitting signal processing unit 100 may further include an encoder parser for demultiplexing the scrambled bits among a plurality of BCC encoders. If LDPC encoding is used in the encoder 110, the transmitting signal processing unit 100 may not use the encoder parser.

The interleaver 120 interleaves the bits of each stream output from the encoder to change the order of bits. Interleaving may be applied only when BCC encoding is used. The mapper 130 maps the sequence of bits output from the interleaver to constellation points. If LDPC encoding is used in the encoder 110, the mapper 130 may further perform LDPC tone mapping in addition to constellation mapping.

When multiple input—multiple output (MIMO) or multiple user (MU)-MIMO is used, the transmitting signal processing unit 100 may use a plurality of interleavers 120 and a plurality of mappers 130 corresponding to the number $N_{SS}$ of spatial streams. In this case, the transmitting signal processing unit 100 may further include a stream parser for dividing outputs of the BCC encoders or the LDPC encoder into blocks that are sent to different interleavers 120 or mappers 130. The transmitting signal processing unit 100 may further include a space-time block code (STBC) encoder for spreading the constellation points from the $N_{SS}$ spatial streams into $N_{STS}$ space-time streams and a spatial mapper for mapping the space-time streams to transmit chains. The spatial mapper may use direct mapping, spatial expansion, or beamforming.

The IFT 140 converts a block of the constellation points output from the mapper 130 or the spatial mapper to a time domain block (i.e., a symbol) by using an inverse discrete Fourier transform (IDFT) or an inverse fast Fourier transform (IFFT). If the STBC encoder and the spatial mapper are used, the inverse Fourier transformer 140 may be provided for each transmit chain.

When MIMO or MU-MIMO is used, the transmitting signal processing unit 100 may insert cyclic shift diversities (CSDs) to prevent unintentional beamforming. The CSD insertion may occur before or after the inverse Fourier transform 140. The CSD may be specified per transmit chain or may be specified per space-time stream. Alternatively, the CSD may be applied as a part of the spatial mapper. When MU-MIMO is used, some blocks before the spatial mapper may be provided for each user.

The GI inserter 150 prepends a GI to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When MIMO or MU-MIMO is used, the GI inserter 150 and the RF transmitter 21 may be provided for each transmit chain.

FIG. 10 is a schematic block diagram exemplifying a receiving signal processing unit in the WLAN, according to some embodiments. Referring to FIG. 10, a receiving signal processing unit 200 includes a GI remover 220, a Fourier transformer (FT) 230, a demapper 240, a deinterleaver 250, and a decoder 260.

An RF receiver 22 receives an RF signal via the antenna unit 30 and converts the RF signal into symbols. The GI remover 220 removes the GI from the symbol. When MIMO or MU-MIMO is used, the RF receiver 22 and the GI remover 220 may be provided for each receive chain.

The FT 230 converts the symbol (i.e., the time domain block) into a block of constellation points by using a discrete Fourier transform (DFT) or a fast Fourier transform (FFT). The Fourier transformer 230 may be provided for each receive chain.

When MIMO or MU-MIMO is used, the receiving signal processing unit 200 may use a spatial demapper for converting the Fourier transformed receiver chains to constellation points of the space-time streams and an STBC decoder for despreading the constellation points from the space-time streams into the spatial streams.

The demapper 240 demaps the constellation points output from the Fourier transformer 230 or the STBC decoder to bit streams. If LDPC encoding is used, the demapper 240 may further perform LDPC tone demapping before constellation demapping. The deinterleaver 250 deinterleaves the bits of each stream output from the demapper 240. Deinterleaving may be applied only when BCC encoding is used.

When MIMO or MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining the streams output from the deinterleavers 250.

The decoder 260 decodes the streams output from the deinterleaver 250 or the stream deparser. For example, the decoder 260 may be an FEC decoder. The FEC decoder may include a BCC decoder or an LDPC decoder. The receiving signal processing unit 200 may further include a descrambler for descrambling the decoded data. If BCC decoding is used in the decoder 260, the receiving signal processing unit 200 may further include an encoder deparser for multiplexing the data decoded by a plurality of BCC decoders. If LDPC decoding is used in the decoder 260, the receiving signal processing unit 200 may not use the encoder deparser.

Figure 11:
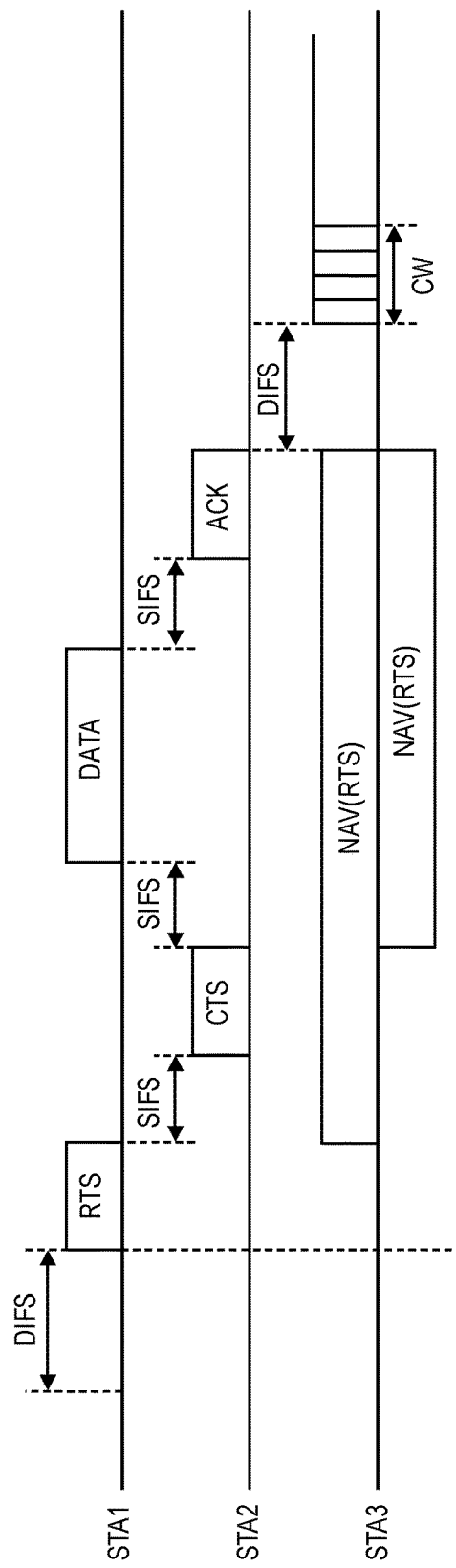
FIG. 11 is a timing diagram providing an example of the Carrier Sense Multiple Access/Collision Avoidance (CSMA/CA) transmission procedure, according to some embodiments.

FIG. 11 is a timing diagram providing an example of the Carrier Sense Multiple Access/Collision Avoidance (CSMA/CA) transmission procedure, according to some embodiments. In the illustrated example, STA1 is a transmit WLAN device for transmitting data, STA2 is a receive WLAN device for receiving the data, and STA3 is a WLAN device, which may be located at an area where a frame transmitted from the STA1 and/or a frame transmitted from the STA2 can be received by the WLAN device.

STA1 may determine whether the channel is BUSY by carrier sensing. The STA1 may determine the channel occupation based on a quality of the signal on the channel or correlation of signals in the channel, or may determine the channel occupation by using a network allocation vector (NAV) timer.

When determining that the channel is not used by other devices during DIFS (that is, the channel is IDLE), STA1 may transmit an RTS frame to STA2 after performing backoff. Upon receiving the RTS frame, STA2 may transmit a CTS frame as a response of the CTS frame after SIFS. When STA3 receives the RTS frame, it may set the NAV timer for a transmission duration of subsequently transmitted frames (for example, a duration of SIFS+CTS frame duration+SIFS+data frame duration+SIFS+ACK frame duration) by using duration information included in the RTS frame. When STA3 receives the CTS frame, it may set the NAV timer for a transmission duration of subsequently transmitted frames (for example, a duration of SIFS+data frame duration+SIFS+ACK frame duration) by using duration information included in the RTS frame. Upon receiving a new frame before the NAV timer expires, STA3 may update the NAV timer by using duration information included in the new frame. STA3 does not attempt to access the channel until the NAV timer expires.

When STA1 receives the CTS frame from the STA2, it may transmit a data frame to the STA2 after SIFS elapses from a time when the CTS frame has been completely received. Upon successfully receiving the data frame, the STA2 may transmit an ACK frame as a response of the data frame after SIFS elapses.

When the NAV timer expires, STA3 may determine whether the channel is BUSY through the use of carrier sensing techniques. Upon determining that the channel is not used by other devices during DIFS and after the NAV timer has expired, STA3 may attempt channel access after a contention window according to random backoff elapses.

Figure 12:
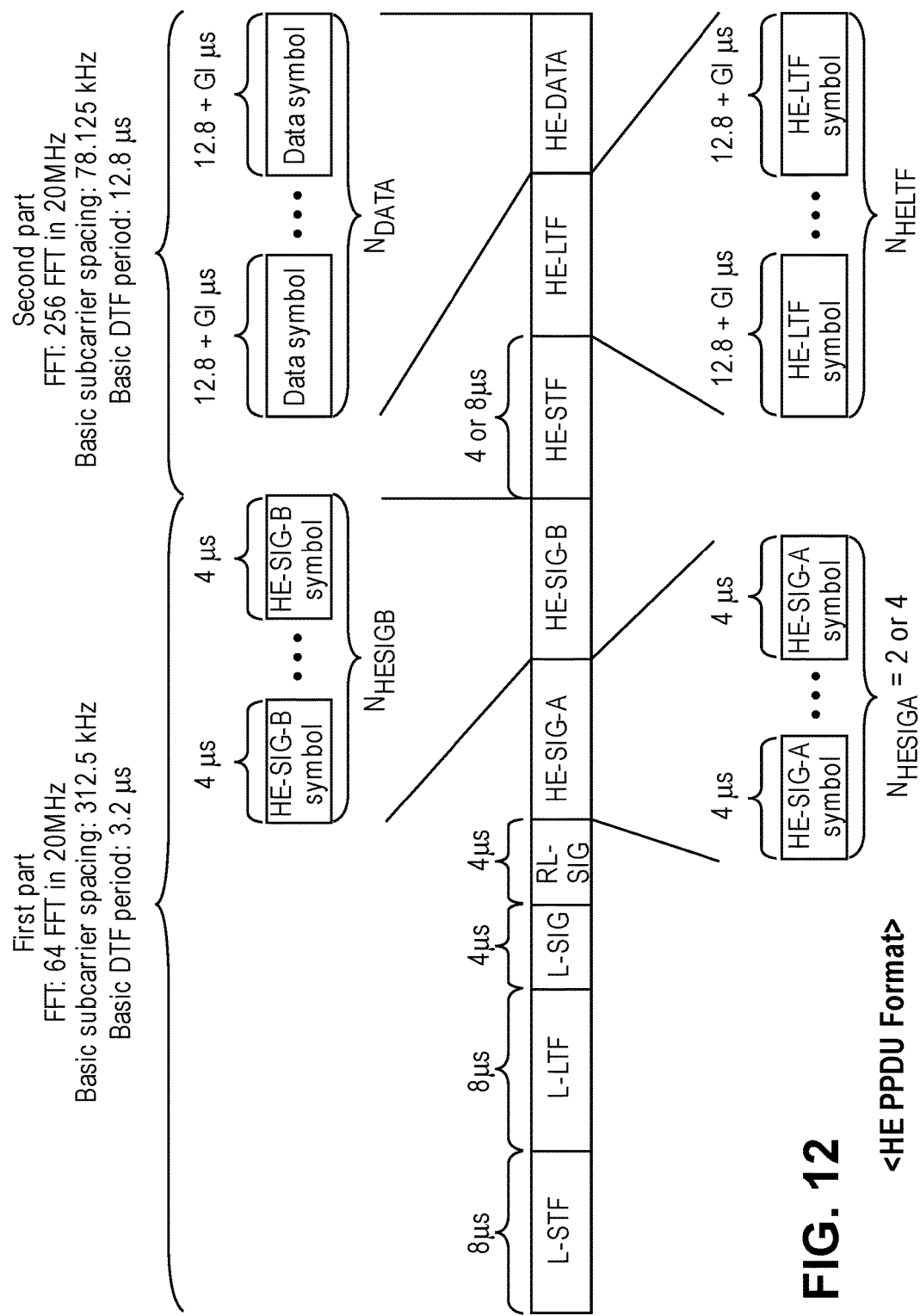
FIG. 12 is a diagram of one embodiment of a format of a high efficiency (HE) physical layer convergence procedure protocol data unit (HE PPDU).

FIG. 12 is a diagram of one embodiment showing a format of a high efficiency (HE) physical layer convergence procedure (PLCP) protocol data unit (HE PPDU) according to an embodiment.

A transmitting STA generates a PPDU frame and transmits it to a receiving STA. The receiving STA receives, detects, and processes the PPDU. The PPDU frame comprises an L-STF field, an L-LTF field, an L-SIG field, an RL-SIG field, an HE-SIG-A field, an HE-SIG-B field, an HE-STF field, an HE-LTF field, and an HE-DATA field. The HE-SIG-A field comprises $N_{HESIGA}$ symbols, the HE-SIG-B field comprises $N_{HESIGB}$ symbols, the HE-LTF field comprises $N_{HELTF}$ symbols, and the HE-DATA field comprises $N_{DATA}$ symbols.

The solutions provided herein have been described with reference to a wireless LAN system; however, it should be understood that these solutions are also applicable to other network environments, such as cellular telecommunication networks, wired networks, etc.

The solutions provided herein have been described with reference to a wireless LAN system; however, it should be understood that these solutions are also applicable to other network environments, such as cellular telecommunication networks, wired networks, and similar communication networks.

An embodiment may be an article of manufacture in which a non-transitory machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hard-wired circuit components.

Some portions of the preceding detailed descriptions have been presented in terms of algorithms and symbolic representations of operations on data bits within a computer memory. These algorithmic descriptions and representations are the ways used by those skilled in conferencing technology to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a conference device, or similar electronic computing device, that manipulates and transforms data represented as physical (electronic) quantities within the conference device's registers and memories into other data similarly represented as physical quantities within the conference device's memories or registers or other such information storage, transmission or display devices.

While the flow diagrams in the figures herein show a particular order of operations performed by certain embodiments, it should be understood that such order is exemplary (e.g., alternative embodiments may perform the operations in a different order, combine certain operations, overlap certain operations, etc.).

Those skilled in the art will recognize that the present disclosure is not limited to the embodiments described, and that the techniques described herein can be practiced with modification and alteration within the spirit and scope of the appended claims. The description is thus to be regarded as illustrative instead of limiting.

What is claimed is:

1. A method of transmitting frames by a first station associated with a first basic service set (BSS) to manage interference amongst overlapping basic service sets (OBSSs), the method comprising:
   detecting, by the first station on a wireless medium, a received frame;
   determining whether the received frame is from a second station, which is associated with a second BSS;
   determining a received signal strength of the received frame;
   determining, by the first station, that the received signal strength is below a first OBSS preamble detection level, where the first OBSS preamble detection level is associated with a first transmission power, where bounds of the first OBSS preamble detection level and the first transmission power relationship are governed by an algorithm that expresses an inverse relationship;
   setting, by the first station, the first transmission power as a maximum transmission power used by the first station for all frame transmissions during a transmission opportunity;
   decrementing, by the first station while the received signal strength is below the first OBSS preamble detection level, a backoff counter until the backoff counter reaches zero, wherein the decrementing of the backoff counter is initiated in response to determining an unconditional network allocation vector (NAV) counter with a first duration has reached zero and a conditional NAV with a second duration has reached zero;
   acquiring, by the first station after the backoff counter reaches zero, the transmission opportunity, wherein the first transmission power is the maximum transmission power used by the first station during the transmission opportunity acquired after the backoff counter reaches zero; and
   increasing, by the first station, the maximum transmission power used by the first station after the transmission opportunity.

2. The method of claim 1, further comprising transmitting, by the first station, one or more transmission frames at or below the first transmission power during the transmission opportunity, wherein the one or more transmission frames are all transmissions by the first station during the transmission opportunity.

3. The method of claim 2, wherein the transmission opportunity is a duration that the first station sets when the first station transmits the one or more transmission frames.

4. The method of claim 1, wherein the first transmission power is a spectral density for transmitting the one or more transmission frames.

5. The method of claim 1, wherein the first transmission power is associated with the first OBSS preamble detection level and a second transmission power is associated with a second OBSS preamble detection level, wherein when the first transmission power is greater than the second transmission power then the first OBSS preamble detection level is less than the second OBSS preamble detection level and when the first transmission power is less than the second transmission power then the first OBSS preamble detection threshold is greater than the second OBSS preamble detection level.

6. A station to implement a method of wireless medium assessment where the station is associated with a first basic service set (BSS) to maximize spatial reuse of the wireless medium while limiting interference to overlapping basic service sets (OBSSs), the station comprising:
   a radio frequency transmitter to communicate on the wireless medium, the radio frequency transmitter to receive a received frame on the wireless medium; and
   a processor communicatively coupled to the radio frequency transmitter, the processor to execute a modified channel assessment module, the modified channel assessment module
   to determine whether the received frame is associated with an OBSS,
   to determine whether the received frame has a signal strength below an adjusted OBSS preamble detection level, in response to the received frame being associated with the OBSS, where the adjusted OBSS preamble detection level is lower than a reference OBSS preamble detection level,
   to set, in response to determining that the signal strength is below the adjusted OBSS preamble detection level, a maximum transmission power of the station to an adjusted transmission power associated with the adjusted OBSS preamble detection level, where bounds of the adjusted OBSS preamble detection level and the adjusted transmission power relationship are governed by an algorithm that expresses an inverse relationship, wherein the maximum transmission power used by the station is used by the station for all frame transmissions during a transmission opportunity,
   to decrement, while the received signal strength is below the first OBSS preamble detection level, a backoff counter until the backoff counter reaches zero, wherein the decrementing of the backoff counter is initiated in response to determining an unconditional network allocation vector (NAV) counter with a first duration has reached zero and a conditional NAV with a second duration has reached zero,
   to acquire after the backoff counter reaches zero, the transmission opportunity, wherein the first transmission power is the maximum transmission power used by the first station during the transmission opportunity acquired after the backoff counter reaches zero, and
   to increase the maximum transmission power used after the transmission opportunity.

7. The station of claim 6, wherein the reference OBSS preamble detection level is associated with a reference transmission power and the station uses the reference transmission power as the maximum transmission power for all transmission prior to the transmission opportunity.

8. The station of claim 6, wherein the radio frequency transmitter: transmits one or more frames on the wireless medium below or at the maximum transmission power for the transmission period.

9. The station of claim 8, wherein the transmission opportunity is a duration that the station sets when transmitting the one or more frames.

10. The station of claim 6, wherein the maximum transmission power is adjusted by spectral density or channel bandwidth.

11. The station of claim 7, wherein the reference transmission power is greater than the adjusted transmission power.

12. The station of claim 6, wherein the reference OBSS preamble detection level is lower than the adjusted OBSS preamble detection level.

* * * * *